(12) United States Patent
Freedman et al.

(10) Patent No.: US 12,135,461 B2
(45) Date of Patent: Nov. 5, 2024

(54) BACKSIDE FIBER ATTACHMENT TO SILICON PHOTONICS CHIP

(71) Applicant: Mellanox Technologies, Ltd., Yokneam (IL)

(72) Inventors: Barak Freedman, Binyamina (IL); Henning Lysdal, Roskilde (DK); Amir Silber, Rehovot (IL); Nizan Meitav, Kiryat Ata (IL)

(73) Assignee: Mellanox Technologies, Ltd., Yokneam (IL)

( * ) Notice: Subject to any disclaimer, the term of this patent is extended or adjusted under 35 U.S.C. 154(b) by 95 days.

(21) Appl. No.: 17/649,849

(22) Filed: Feb. 3, 2022

(65) Prior Publication Data

US 2022/0276452 A1 Sep. 1, 2022

Related U.S. Application Data

(60) Provisional application No. 63/200,283, filed on Feb. 26, 2021, provisional application No. 63/186,981, filed on May 11, 2021.

(51) Int. Cl.
*G02B 6/42* (2006.01)
*G02B 6/30* (2006.01)

(52) U.S. Cl.
CPC ............ *G02B 6/4206* (2013.01); *G02B 6/30* (2013.01); *G02B 6/4214* (2013.01)

(58) Field of Classification Search
CPC ...... G02B 6/4204; G02B 6/124; G02B 6/305; G02B 6/4232; G02B 6/4249; G02B 6/30;
(Continued)

(56) References Cited

U.S. PATENT DOCUMENTS 6,404,955 B1 * 6/2002 Kikuchi ............... G02B 6/4225
385/35
9,151,917 B2 * 10/2015 Lee ...................... G02B 6/4239
(Continued)

FOREIGN PATENT DOCUMENTS

CN 1967303 A 5/2007
CN 102478686 A * 5/2012 ............... G02B 6/34
(Continued)

OTHER PUBLICATIONS

Chinese Office Action from corresponding Chinese Application No. 202210144534.6, dated Aug. 30, 2023, 12 pages, with English translation.

*Primary Examiner* — Michael P Mooney
(74) *Attorney, Agent, or Firm* — Moore & Van Allen PLLC; R. W. McCord Rayburn

(57) ABSTRACT

Various embodiments of silicon photonic (SiP) chips are provided that are configured for backside or frontside optical fiber coupling. An SiP chip includes a photonic integrated circuit formed on a first surface of a first substrate. The photonic integrated circuit includes at least one optical component and at least one coupling element. The at least one optical component is configured to propagate an optical signal therethrough in a waveguide propagation direction that is substantially parallel to a plane defined by the first surface. The at least one coupling element is configured to couple an optical signal propagating along an optical path transverse to the waveguide propagation direction into the at least one optical component to enable the backside or frontside coupling of an optical fiber to the SiP chip.

20 Claims, 10 Drawing Sheets

(58) Field of Classification Search
CPC .......... G02B 6/12; G02B 6/122; G02B 6/262; G02B 6/29304
See application file for complete search history.

(56) References Cited

U.S. PATENT DOCUMENTS

| | | | |
|---|---|---|---|
| 2002/0015920 A1* | 2/2002 | Steinberg | G02B 6/1221 430/321 |
| 2003/0026538 A1 | 2/2003 | Hamanaka | |
| 2003/0044118 A1* | 3/2003 | Zhou | G02B 6/14 385/28 |
| 2003/0165288 A1* | 9/2003 | Deliwala | G02B 6/3536 385/25 |
| 2004/0150873 A1* | 8/2004 | Pearsall | G02B 6/1225 359/321 |
| 2006/0013525 A1 | 1/2006 | Murayama | |
| 2010/0329607 A1* | 12/2010 | Drost | G02B 6/30 385/37 |

FOREIGN PATENT DOCUMENTS

| | | |
|---|---|---|
| CN | 103217740 A | 7/2013 |
| CN | 112331726 A | 2/2021 |

\* cited by examiner

BACKSIDE FIBER ATTACHMENT TO SILICON PHOTONICS CHIP

CROSS-REFERENCE TO RELATED APPLICATIONS

This application claims priority to U.S. Application No. 63/200,283, filed Feb. 26, 2021, and U.S. Application No. 63/186,981, filed May 11, 2021, the entirety of the contents of which are incorporated by reference herein.

TECHNICAL FIELD

Example embodiments generally relate to the coupling of optical fibers to silicon photonics chips. For example, various embodiments relate to the coupling of optical fibers to the backside or frontside of silicon photonics chips.

BACKGROUND

Conventional optical fibers are coupled to silicon photonic (SiP) chips using a V-groove coupling technique. V-groove coupling techniques include positioning an optical fiber within a V-groove such that the optical fiber extends from the edge of the SiP chip. This requires fiber pigtails that extend from the edge of the SiP chip that are then used to couple the SiP chip to one or more optical sources and/or outputs. However, such fiber pigtails are easily damaged, resulting in the entire SiP chip and the connecting optical elements needing to be replaced.

BRIEF SUMMARY

Example embodiments provide methods, devices, methods for manufacturing devices, and/or the like for coupling optical fibers to the backside or the frontside of SiP chips. Various embodiments described herein provide for attachment of a single optical fiber or an array of optical fibers (e.g., coupled to a fiber block and/or mechanical transfer (MT) ferrule) to a silicon photonics integrated circuit. Various embodiments provide for less strict assembly requirements being imposed on the fiber attachment and provide better optical signal coupling into the SiP. For example, various embodiments enable an optical fiber to be coupled to an SiP chip anywhere on the chip (e.g., embodiments are not restricted to edge coupling). Moreover, various embodiments enable a detachable coupling of periphery optics to the SiP chip. For example, in various embodiments, the optical connection between the SiP chip and an external optical source or optical receiver is "pluggable."

For example, in various embodiments, a photonic integrated circuit comprising a coupling element is formed on a first surface of a first substrate. A cavity that is aligned with the coupling element is formed through the second surface of the first substrate. An optical fiber is secured within the cavity such that the optical fiber is optically coupled to an optical component of the SiP chip by the coupling element. In various embodiments, the coupling element is a grating or a mirror.

For example, in various embodiments, a photonic integrated circuit (e.g., a PIC) is formed on a first surface of a first substrate. The PIC includes a corresponding coupling element. The corresponding coupling element is configured to optically couple a respective optical fiber, via a connector optical path, to at least one optical component of the SiP. A connector including a waveguide interfacing component and an optical fiber interfacing component is mechanically coupled to the first substrate. The optical fiber interfacing component includes a cavity formed in part through a portion of the connector. The cavity is configured to have an optical fiber secured therein. The optical fiber interfacing component and the waveguide interfacing component are collectively configured to optically couple the optical fiber secured within the cavity to the corresponding coupling element of the integrated photonic circuit via the connector optical path. In an example embodiment, the connector and the photonic integrated circuit are configured such that a chip or wafer on which the PIC is formed is configured to be flip-mounted onto a second substrate.

Various embodiments provide silicon photonic (SiP) chips configured for backside or frontside optical fiber coupling. A SiP chip comprises a photonic integrated circuit formed on a first surface of a first substrate. The photonic integrated circuit comprises at least one optical component and at least one corresponding coupling element. The at least one optical component is configured to propagate an optical signal therethrough in a waveguide propagation direction that is substantially parallel to a plane defined by the first surface of the first substrate. The at least one corresponding coupling element is configured to couple an optical signal propagating along an optical path transverse to the waveguide propagation direction into the at least one optical component to enable the backside or frontside coupling of an optical fiber to the SiP chip.

Thus, various embodiments provide PICs formed as at least a part of an SiP chip, for example, that are configured to be coupled to exterior optical sources and/or optical receivers via optical fibers that are coupled to the frontside or the backside of the SiP chip.

According to an aspect of the present disclosure, a silicon photonic (SiP) chip configured for backside or frontside optical fiber coupling. The SiP chip comprises a photonic integrated circuit formed on a first surface of a first substrate. The photonic integrated circuit comprises at least one optical component and at least one corresponding coupling element. The SiP chip comprises at least one cavity formed through a second surface of the first substrate. The second surface of the first substrate is opposite the first surface of the first substrate. The at least one cavity is aligned with the at least one corresponding coupling element. The SiP chip further comprises at least one optical fiber secured within the at least one cavity such that the at least one optical fiber is optically coupled to the at least one optical component by the at least one corresponding coupling element.

According to another aspect of the present disclosure, silicon photonic (SiP) chip configured to be coupled to at least one attached optical fiber (e.g., via a backside or frontside optical fiber coupling) is provided. In an example embodiment, the SiP chip comprises a photonic integrated circuit formed on a first surface of a first substrate, the photonic integrated circuit comprising a coupling element and an optical component; and a connector comprising a waveguide interfacing component and an optical fiber interfacing component. The optical fiber interfacing component comprises a cavity formed in part therethrough and configured to have an optical fiber secured therein. The optical fiber interfacing component and the waveguide interfacing component are, collectively, configured to optically couple the optical fiber to a corresponding coupling element of a photonic integrated circuit via a connector optical path that passes through a second surface of the first substrate. The second surface of the first substrate is opposite the first surface of the first substrate.

According to yet another aspect an SiP chip configured for backside or frontside optical fiber coupling is provided. The SiP chip comprises a first substrate, the first substrate having a first surface and a second surface disposed opposite the first surface; and a photonic integrated circuit formed on the first surface of the first substrate. The photonic integrated circuit comprises an optical component and a coupling element. The optical component is configured to propagate an optical signal therethrough in a waveguide propagation direction that is substantially parallel to a plane defined by the first surface of the first substrate. To enable the backside or frontside coupling of an optical fiber to the SiP chip, the coupling element is configured to perform at least one of (a) coupling an optical signal propagating along an optical path transverse to the waveguide propagation direction into the optical component or (b) coupling an optical signal propagating in the waveguide propagation direction into the optical path transverse to the waveguide propagation direction.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 2A:
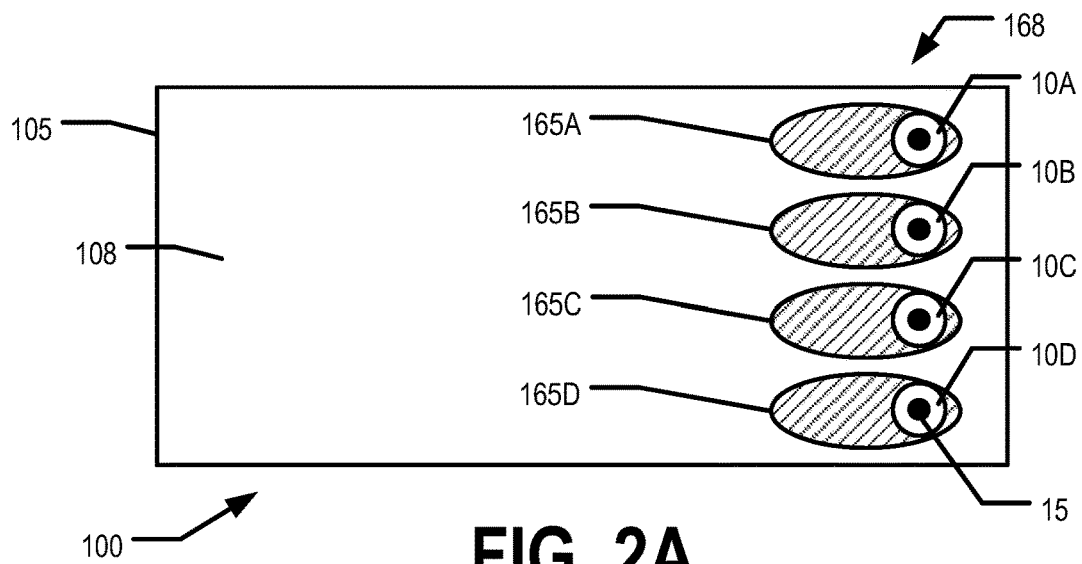
Figure 2B:
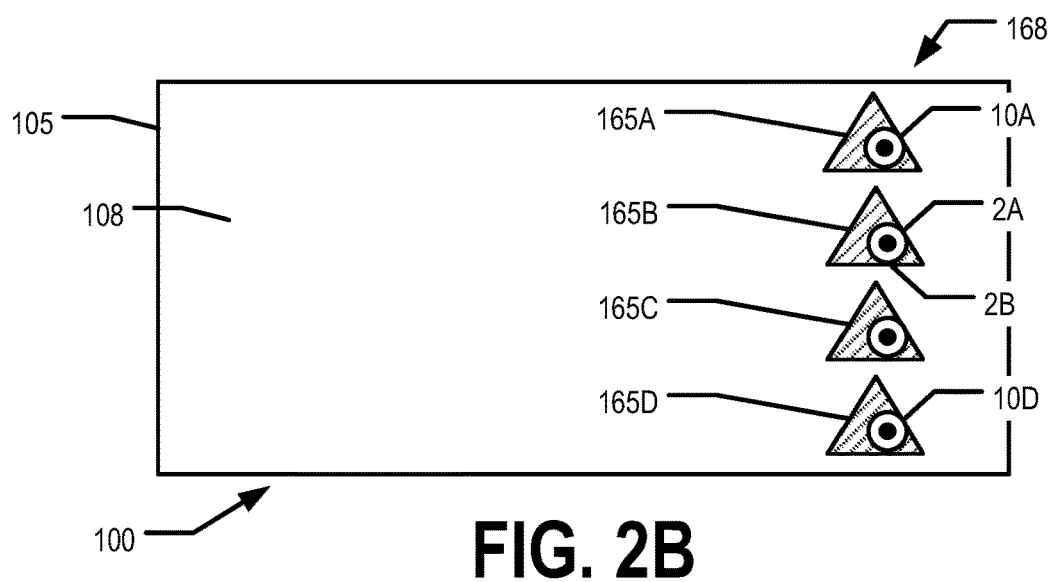
Figure 2C:
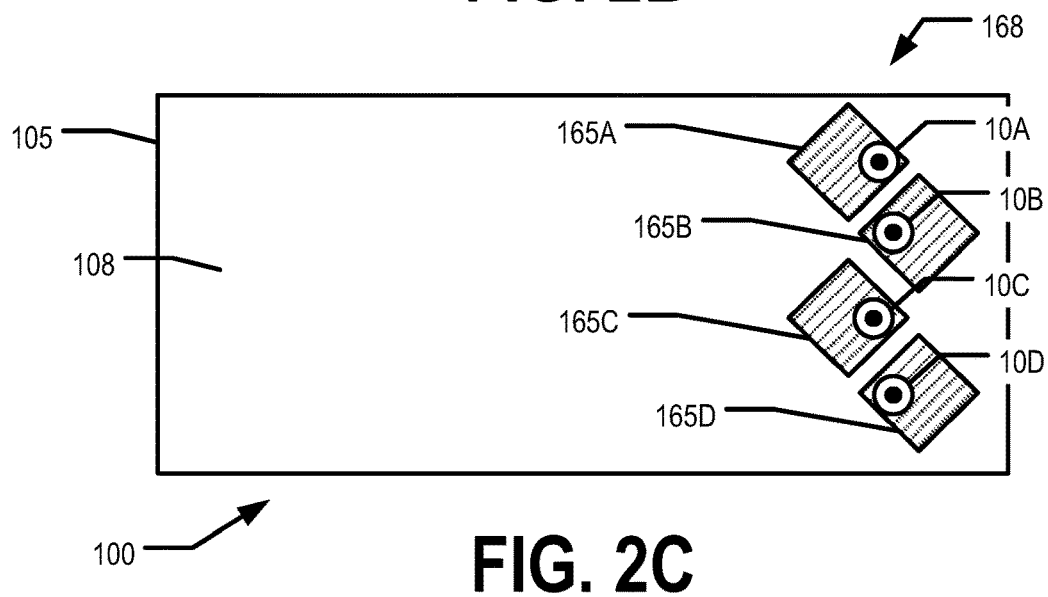
Figure 3A:
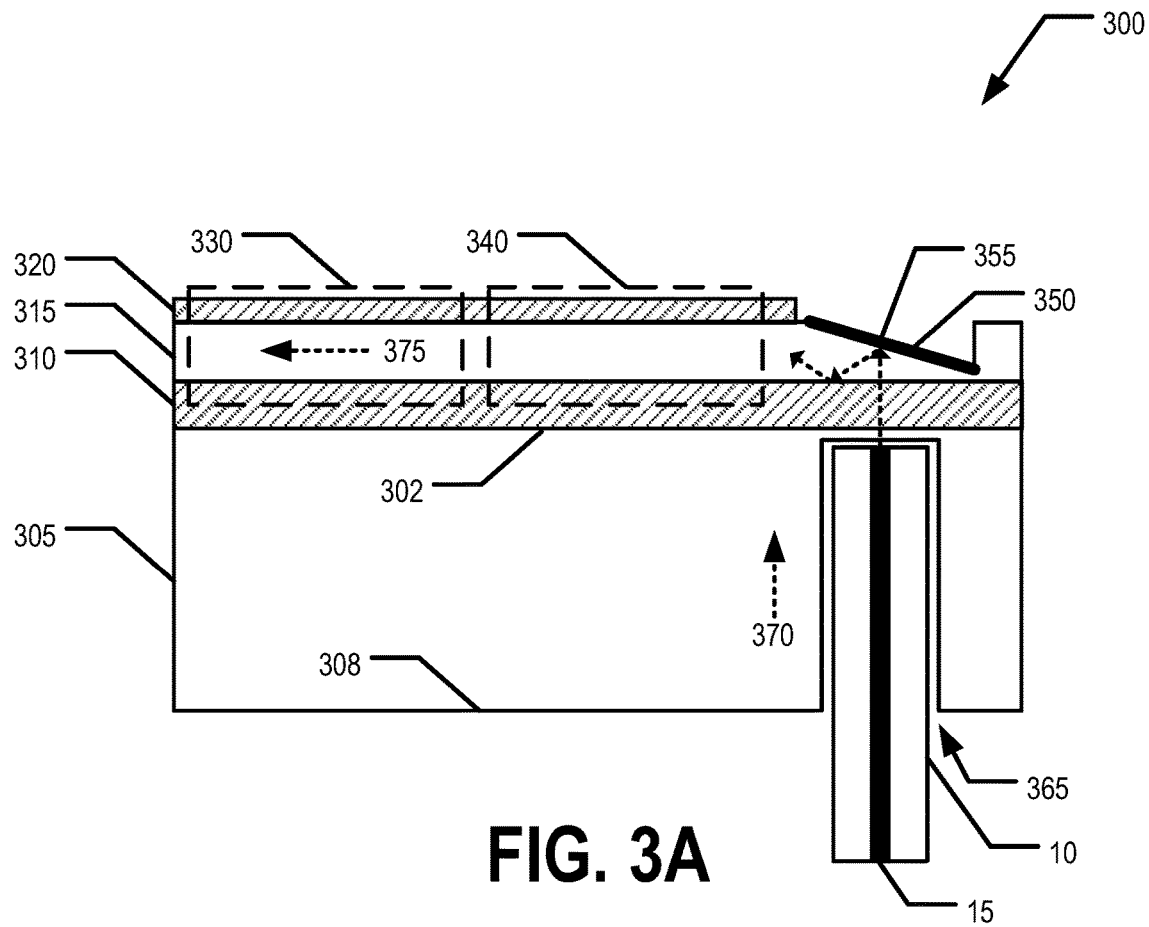
Figure 3B:
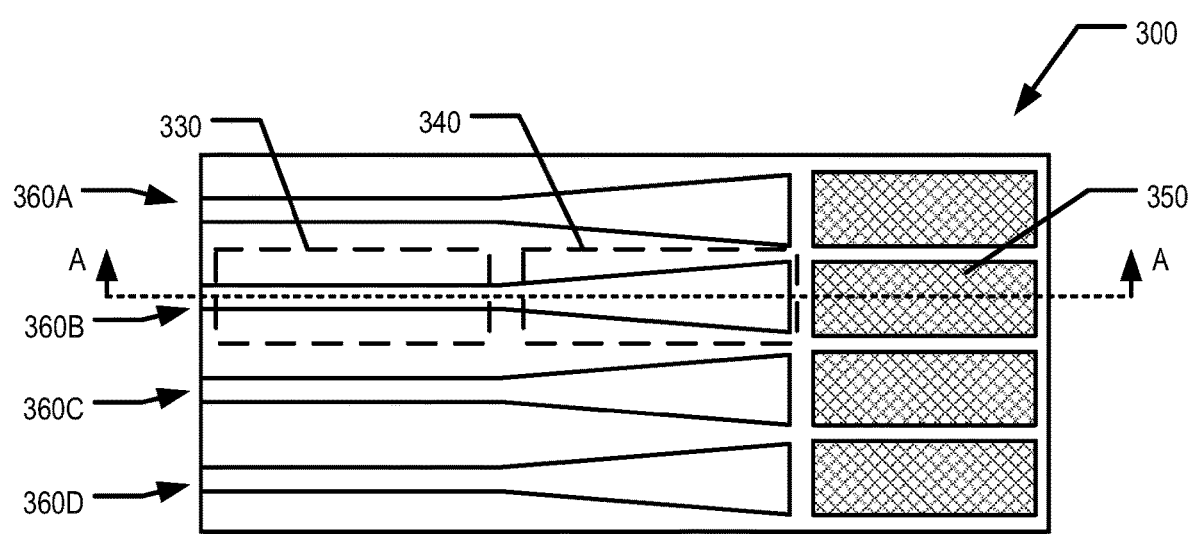
Figure 10:
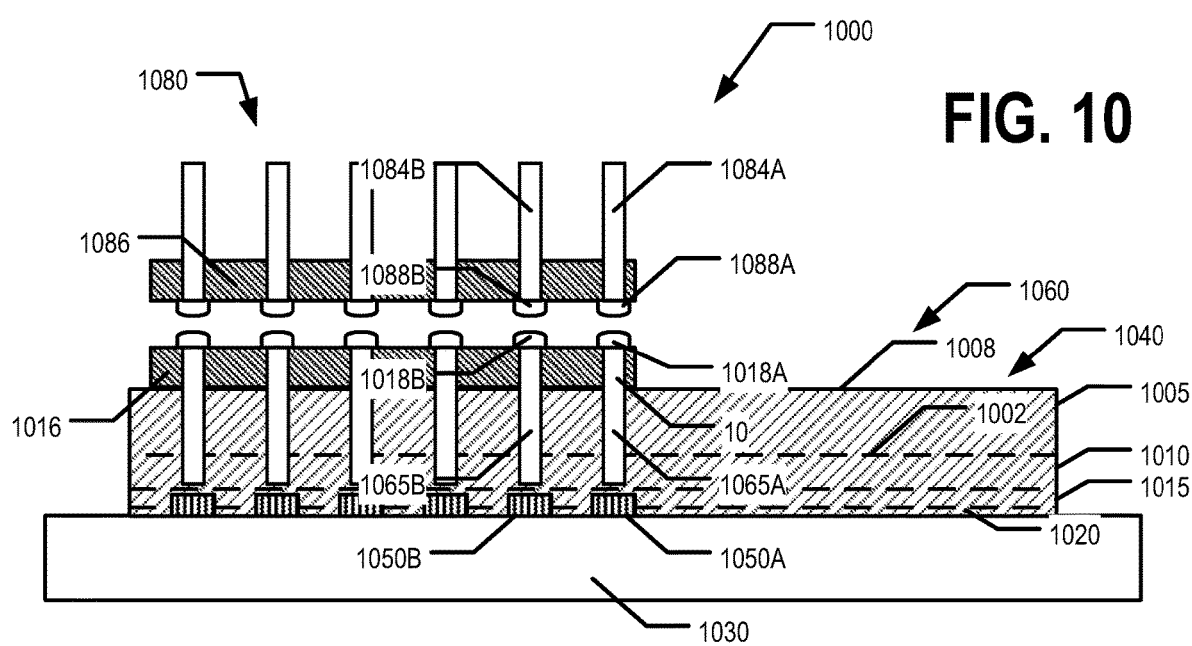
Figure 11:
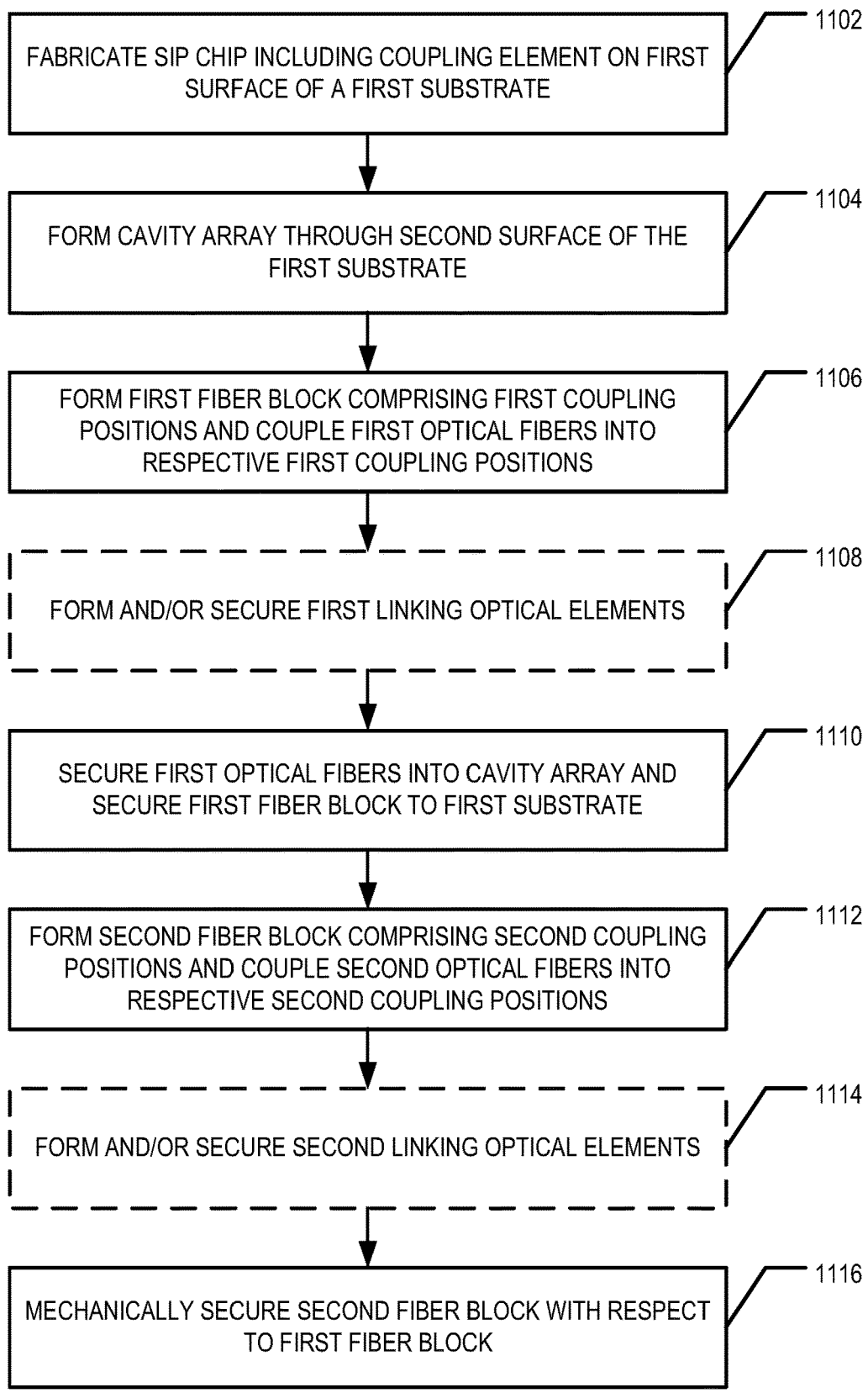
Figure 12:
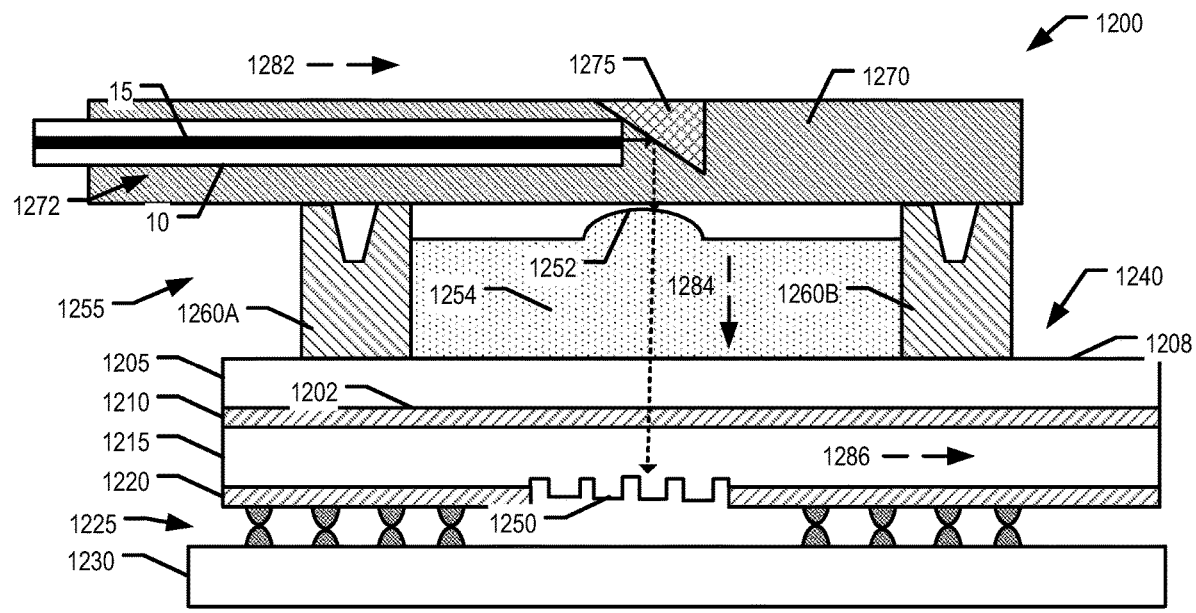
Figure 13:
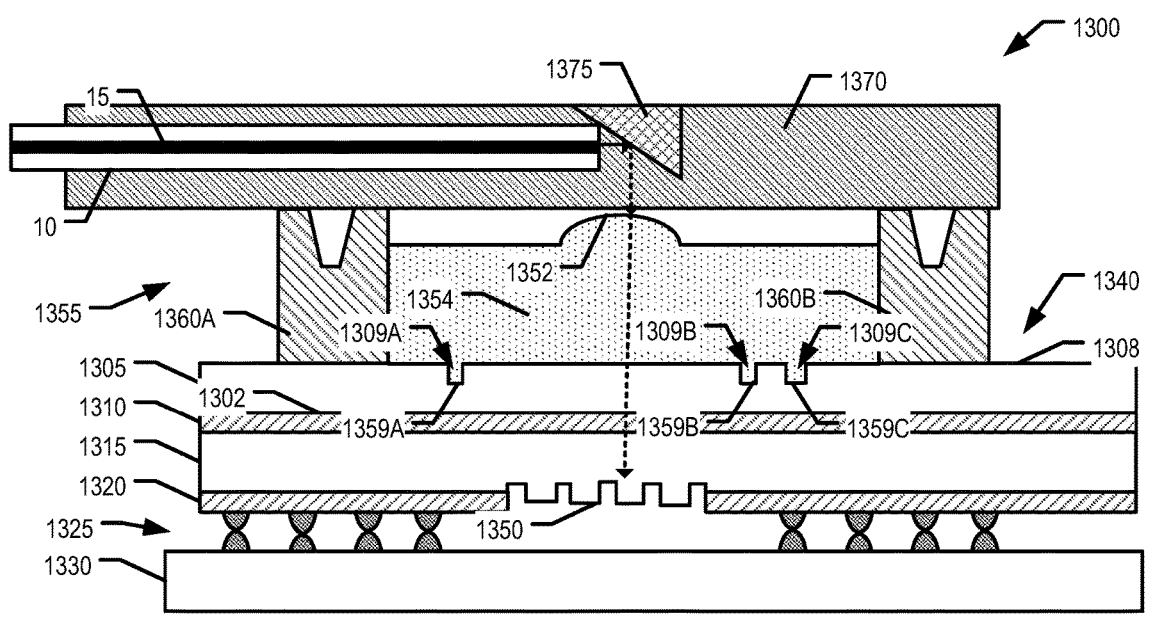

FIGS. 2A, 2B, and 2C are schematic views of bottom views of example SiP chips, according to various embodiments;

FIG. 3A is a schematic of a portion of a cross-section of another example SiP chip having a photonic integrated circuit formed thereon and an optical fiber coupled to a backside thereof, according to an example embodiment;

FIG. 3B is a schematic top view of a portion of the example SiP chip shown in FIG. 3A;

FIGS. 4, 5, 6, 7, 8, and 9 are each schematics of respective portions of cross-sections of example SiP chips having respective photonic integrated circuits formed thereon and respective optical fibers coupled to respective backsides thereof, according to various embodiments;

FIG. 10 is a schematic of a coupling of an SiP chip on which a plurality of photonic integrated circuits are formed with respective optical sources and/or receivers coupled thereto using fiber blocks, in accordance with an example embodiment;

FIG. 11 is a flowchart illustrating various processes, procedures, and/or operations for fabricating the SiP chip coupled to a plurality of optical sources and/or receivers using fiber blocks, in accordance with an example embodiment; and FIGS. 12 and 13 are each schematics of respective portions of cross-sections of example SiP chips coupled to respective optical sources/receivers via a connector, in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. As used herein, the terms "approximately" and "substantially" refer to within appropriate manufacturing and/or engineering tolerances. Like numbers refer to like elements throughout.

Photonic integrated circuits (PICs) are a current area of investigation for a variety of applications. For example, various types of PICs have applications in fiber-optic communications, the biomedical field, photonic computing, autonomous vehicles, and other fields. In various circumstances, PICs are formed and/or fabricated as SiP on and/or as part of an SiP chip.

Various fiber-optic communications applications, for example, require an optical signal from a PIC waveguide (e.g., a waveguide formed on and/or as part of an SiP chip) to be passed to an external optical fiber or for an optical signal to be passed from an external optical fiber to a PIC waveguide (e.g., a waveguide formed on and/or as part of an SiP chip). For example, an optical fiber may be used to provide an optical signal from an external source or may be used to provide an optical signal from the PIC to an external receiver. Thus, efficient methods for coupling and/or efficient coupling devices are needed for coupling external optical fibers to PICs and/or SiP chips.

Conventionally optical fibers are coupled to SiP chips using a V-groove coupling technique. V-groove coupling techniques include positioning an optical fiber within a V-groove such that the optical fiber extends from the edge of the SiP chip. This requires fiber pigtails that extend from the edge of the SiP chip that are then used to couple the SiP chip to one or more optical sources and/or outputs. However, such fiber pigtails are easily damaged, resulting in the entire SiP chip and the connecting optical elements needing to be replaced. Thus, technical problems exist regarding how to couple external optical fibers to SiP chips in a robust manner.

Various embodiments provide technical solutions to these technical problems. For example, various embodiments provide SiP chips that include coupling elements that are configured to optically couple respective waveguides of the SiP chips to optical fibers that are coupled to the backside or the front side of the SiP chip. For example, various embodiments provide SiP chips that include coupling elements that are configured to couple respective optical signals provided by a respective external optical fiber into a respective waveguide of the SiP chip and/or from a respective waveguide of the SiP chip into a respective external optical fiber where the propagation direction of the waveguide is transverse (e.g., substantially orthogonal) to the propagation direction of the optical fiber. Thus, various embodiments provide technical improvements to the fields of PICs, SiP chips, and/or the like.

Example SiP Chip with Backside (or Frontside) Optical Fiber Coupling

Figure 1A:
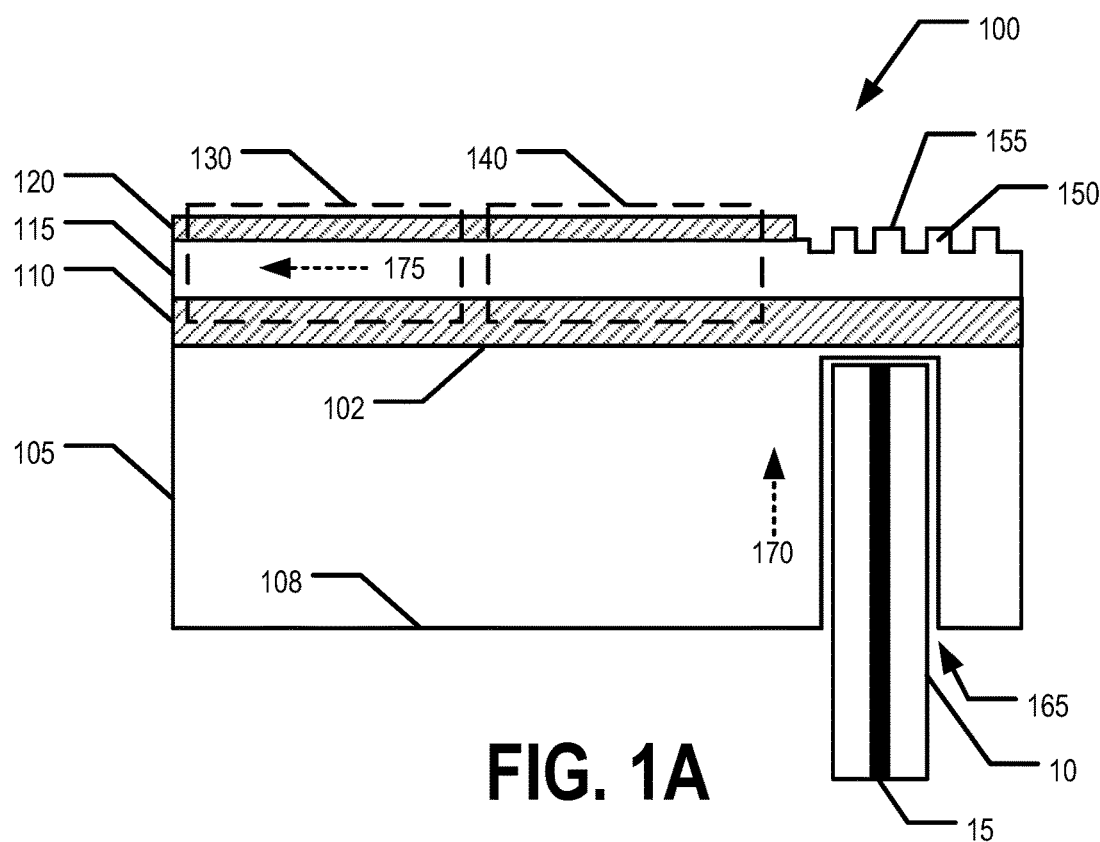
FIG. 1A is a schematic of a portion of a cross-section of an example SiP chip having a photonic integrated circuit formed thereon and an optical fiber coupled to a backside thereof, according to an example embodiment.
Figure 1B:
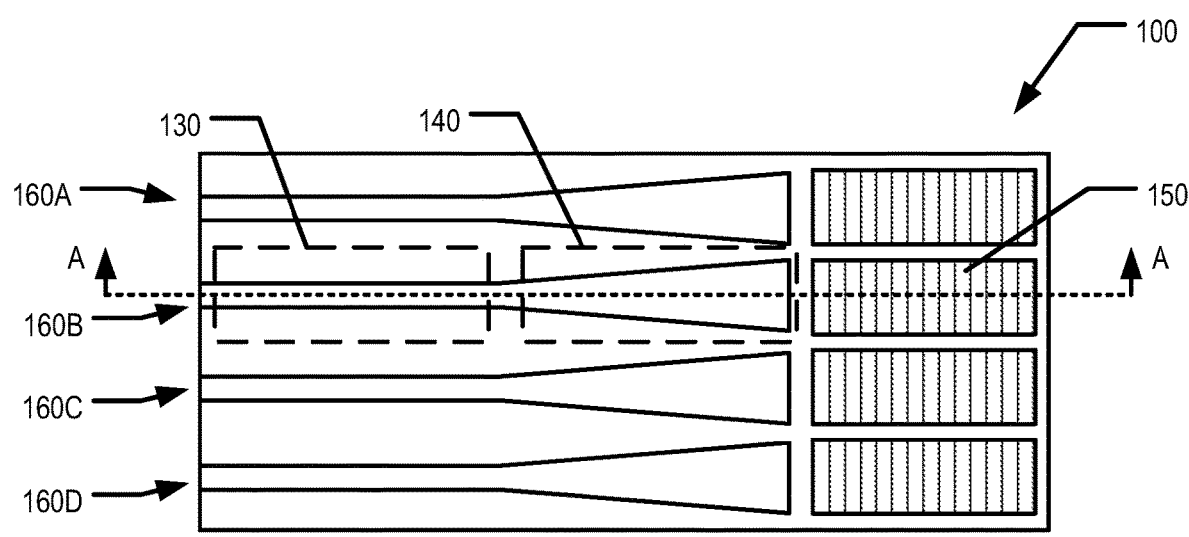
FIG. 1B is a schematic top view of a portion of the example SiP chip shown in FIG. 1A.

FIG. 1A illustrates a partial cross-section of an example SiP chip 100 along the dotted line shown in FIG. 1B. FIG. 1B provides a partial top view of the example SiP chip 100. The SiP chip 100 comprises four channels 160 (e.g., 160A, 160B, 160C, and 160D). Various SiP chips may include fewer or more channels 160, as appropriate for the application. Each channel includes a coupling element 150 and a waveguide 130. In various embodiments, the waveguide 130 may extend farther than illustrated in FIGS. 1A and 1B and may provide optical signals propagating therethrough to various optical elements (e.g., modulators, phase delay elements, mirrors, lenses, detectors, and/or the like). In various embodiments, the waveguide 130 is a silicon or silicon nitride (SiN) waveguide or other waveguide configured to propagate optical signals in an appropriate wavelength range for the application.

In the illustrated embodiment, each channel 160 comprises a mode converter 140. In various embodiments, the mode converter 140 is configured to cause a selected mode of the optical signal provided to the coupling element 150 (e.g., via the optical fiber 10) to be coupled into the waveguide 130, while reducing the amplitude of non-selected modes that are propagated through the waveguide 130.

In various embodiments, the SiP chip 100 comprises a first substrate 105. In various embodiments, the first substrate is a silicon substrate and/or comprises silicon. Various other substrate compositions may be used as the first substrate 105 in other embodiments as appropriate for the application. A first cladding layer 110 may be formed on a first surface 102 of the first substrate 105. The first cladding layer 110 is configured to electrically isolate the PIC(s) formed on the SiP chip 100 from the first substrate 105. In various embodiments, the first cladding layer 110 comprises $SiO_2$ or other oxide, benzocyclobutene (BCB), SiN, one or more dielectric layers, and/or the like.

In various embodiments, the SiP chip 100 further comprises a waveguide layer 115 formed on the first cladding layer 110. The waveguide layer 115 may comprise one or more waveguides configured to control the propagation of optical signals through the respective PICs. For example, the waveguide layer 115 may define one or more optical paths through which optical signals are propagated during the functioning of the respective PICs formed on the SiP chip 100. For example, the waveguide layer 115 may comprise one or more structures forming and/or defining the waveguide 130 and the mode converter 140 of the various channels 160 of the SiP chip 100.

In various embodiments, the SiP chip 100 further comprises a second cladding layer 120 formed on the waveguide layer 115 such that the waveguide layer 115 is substantially sandwiched between the first cladding layer 110 and the second cladding layer 120. The second cladding layer 120 is configured to electrically and/or optically isolate the PIC(s) formed on the SiP chip 100 from external fields, currents, and/or the like, and/or to protect components of the PIC(s) formed on the SiP chip 100. In various embodiments, the second cladding layer 120 comprises $SiO_2$ or other oxide, benzocyclobutene (BCB), SiN, one or more dielectric layers, and/or the like.

Thus, the SiP chip 100 comprises one or more PIC(s) formed on the first surface 102 of the first substrate 105. The PIC(s) define respective waveguide propagation directions 175 that are generally in a plane that is substantially parallel to a plane defined by the first surface 102 of the first substrate 105.

One or more cavities 165 are etched through the second surface 108 of the first substrate 105. The cavities 165 extend at least partially through the first substrate 105 in a direction that is transverse (e.g., substantially perpendicular) to the plane defined by the first surface 102 of the first substrate 105. In various embodiments, the one or more cavities are formed using laser drilling, wet etching, deep reactive-ion etching (DRIE), and/or the like.

In various embodiments, each of the one or more cavities are configured to receive at least a portion of a respective optical fiber 10 therein. The respective optical fiber 10 and/or the fiber core 15 of the respective optical fiber 10 defines a fiber propagation direction 170. The fiber propagation direction 170 is transverse (e.g., substantially orthogonal) to the waveguide propagation direction 175.

Each of the one or more cavities 165 may be aligned with a respective coupling element 150. For example, the SiP chip 100 may include a coupling element 150 for each channel 160, in an example embodiment. In an example embodiment, the SiP chip 100 contains a coupling element 150 for an external optical source and/or an optical receiver associated with the PIC(s) formed on the SiP chip 100. The coupling element 150 may be configured to optically couple the fiber core 15 of the respective optical fiber 10 with a respective waveguide 130 (e.g., via mode converter 140).

In various embodiments, a coupling element 150 is configured to change the propagation direction of an optical signal to couple the optical signal provided by the optical fiber 10 (e.g., propagating in the fiber propagation direction 170) into the waveguide 130 (e.g., so that the optical signal is propagating in the waveguide propagation direction 175). In the illustrated embodiment, the coupling element 150 is a grating. In the illustrated embodiment, a surface of the grating is coated with an anti-reflection coating 155. In an example embodiment, the grating is coated with a metallic coating, such as a gold coating, aluminum coating, and/or the like. In various embodiments, the coupling element 150 is a diffraction grating configured to diffract the optical signal provided by the optical fiber 10 into the waveguide 130 (e.g., via the mode converter 140).

The optical fiber 10 may be mechanically secured into a cavity 165 such that the optical fiber 10 is optically coupled to an optical component of the SiP chip 100 (e.g., waveguide 130, mode converter 140, and/or the like) via the coupling element 150. In various embodiments, the optical fiber 10 is one of an array of optical fibers that are each mechanically secured into respective cavities 165 of an array of cavities through the second surface 108 of the first substrate 105 with each cavity 165 of the cavity array aligned with respective coupling elements 150 of the SiP chip 100 so as to optically couple the optical fibers 10 with respective optical elements of the SiP chip 100 (e.g., respective waveguides 130, respective mode converters 140, and/or the like).

In various embodiments, one or more optical fibers 10 of the array of optical fibers are mechanically secured into a fiber block. The fiber block provides protection of the optical fibers 10 (e.g., to prevent damage thereto). In various embodiments, the fiber block enables the optical fibers 10 to be removably secured or irremovably secured into the cavity array, as appropriate for the application. In an example embodiment, the fiber block enables the removable or pluggable coupling of the external source and/or receiver, for example, as described with respect to FIG. 10. In various embodiments, the fiber block is, comprises, and/or terminates in a mechanical transfer (MT) ferrule, a collimating lens block, and/or other appropriate optical fiber connector, thus allowing detachable connection with a fiber block extension.

Figure 1C:
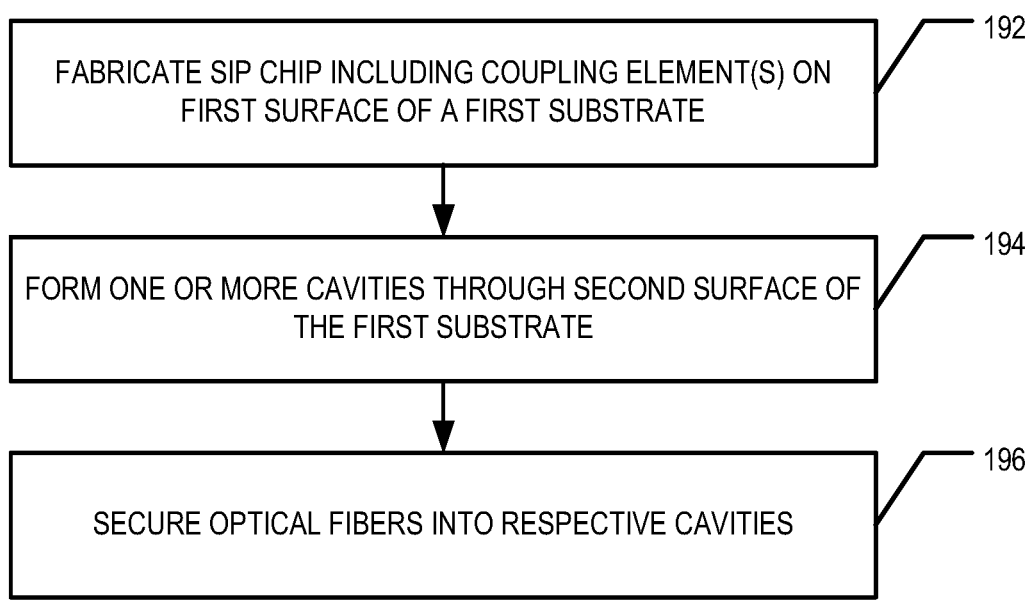
FIG. 1C is a flowchart illustrating various processes, procedures, and/or operations for fabricating the SiP chip shown in FIGS. 1A and 1B, according to an example embodiment.

Example Method of Fabricating an SiP Chip with Backside (or Frontside) Optical Fiber Coupling FIG. 1C provides a flowchart illustrating various processes, procedures, operations, and/or the like for fabricating an SiP chip 100 with backside (or frontside) optical fiber couplings. Staring at step/operation 192, the SiP chip 100 is fabricated. For example, the SiP chip 100 is fabricated to have one or more PICs formed on a first surface 102 of a first substrate 105 of the SiP chip 100. For example, the PICs formed on the SiP chip 100 are organized into one or more channels 160 and/or comprise waveguides 130, mode converters 140, and/or other optical elements. The SiP chip 100 comprises one or more coupling elements 150, each of which is associated with one or more optical elements (e.g., waveguides 130, mode converters 140). For example, coupling elements 150 may be located at various input and/or output locations of the PIC(s) formed on the SiP chip 100.

At step/operation 194, one or more cavities (e.g., a cavity array) are etched and/or formed through the second surface 108 of the first substrate 105. The second surface 108 of the first substrate 105 is an opposing surface of the first substrate 105 with respect to the first surface 102 of the first substrate 105. In various embodiments, the second surface 108 is opposite the first surface 102 of the first substrate. In various embodiments, the one or more cavities are formed using laser drilling, wet etching, DRIE, and/or the like. In various embodiments, the one or more cavities are formed and/or etched to align with a respective coupling element 150 of the SiP chip 100.

In various embodiments, the one or more cavities 165 extend partially through the first substate 105. In various embodiments, the one or more cavities 165 extend through the first surface 102 of the first substate 105 (see FIGS. 6, 8, and 9). In various embodiments, the one or more cavities 165 extend at least partially through the first cladding layer 110. In an example embodiment, the one or more cavities 165 extend through the first substrate 105, the first cladding layer 110, the waveguide layer 115, and the second cladding 120. In various embodiments, the cavities 165 are formed and/or etched to a depth that is appropriate for the application.

At step/operation 196, optical fibers 10 are secured into respective cavities 165 of the one or more cavities. For example, an optical fiber 10 may be inserted into a cavity 165 and secured therein. In various embodiments, an array of optical fibers is secured to a fiber block, and the fibers are collectively inserted into respective cavities 165 of an array of cavities.

In various embodiments, the shape of the cavities 165 in a cross-section taken substantially perpendicular to the fiber propagation direction 170 and/or substantially parallel to the plane defined by the first surface 102 of the first substrate 105 is configured to guide an optical fiber 10 inserted therein into proper alignment with the respective coupling element 150.

FIGS. 2A, 2B, and 2C illustrate three different cavity arrays 168 formed through the second surface 108 of a respective first substrate 105. Each of the illustrated cavity arrays 168 may have a shape that is configured to guide the optical fiber 10 inserted therein into alignment with the corresponding coupling element 150. For example, in various embodiments, the shape of a cavity 165 of the cavity array 160 (in a cross-section taken substantially perpendicular to the fiber propagation direction 170 and/or substantially parallel to the plane defined by the first surface 102 of the first substrate 105) is circular, elliptical, triangular, or diamond-shaped or may have some other polygon, regular, or irregular shape. In various embodiments, the shape of the cavity 165 is configured for the optical fiber 10 inserted therein to have two points of contact 2A, 2B with the edge of the cavity to align the fiber core 15 appropriately with respect to the respective coupling element 150 and, possibly, to provide structural support to the optical fiber 10. As should be understood, the cavity array 168 may include rows and/or columns of cavities 165 (as in FIGS. 2A and 2B), staggered cavities 165 (as in FIG. 2C), and/or cavities 165 organized in another manner that is appropriate for the PICs formed on the SiP chip 100.

Figure 4:
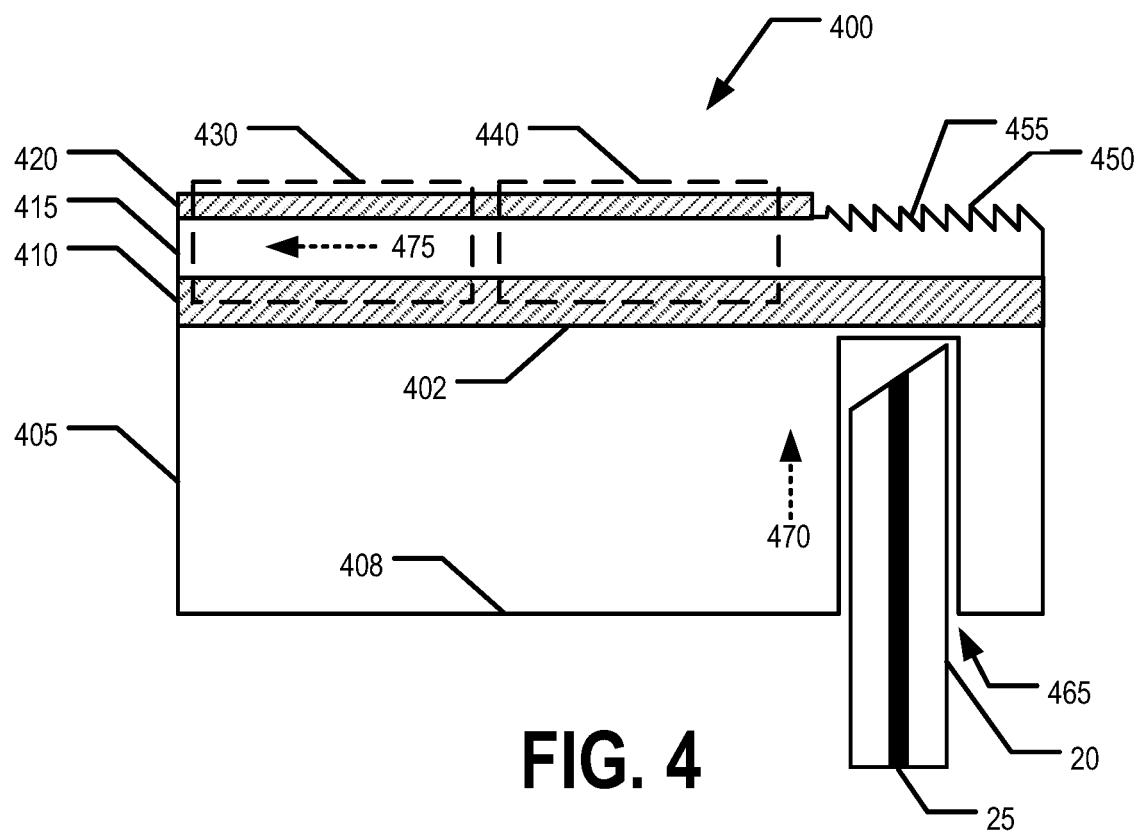

Some Other Example Embodiments of SiP Chips with Backside (or Frontside) Optical Fiber Couplings FIGS. 3A-9 illustrate various embodiments of SiP chips with backside (or frontside) optical fiber couplings. Various aspects of the embodiments illustrated in FIGS. 3A-9 may be combined in various manners, as appropriate for the intended application of the SiP chips. For example, FIG. 4 illustrates an SiP chip 400 having a coupling element 450 that is a blazed grating and a chamfered optical fiber 20. As one of ordinary skill in the art will understand based on the disclosure provided herein, the coupling element 150 of the SiP chip 100 could be a blazed grating in an example embodiment without requiring the use of a chamfered optical fiber 20.

Figure 5:
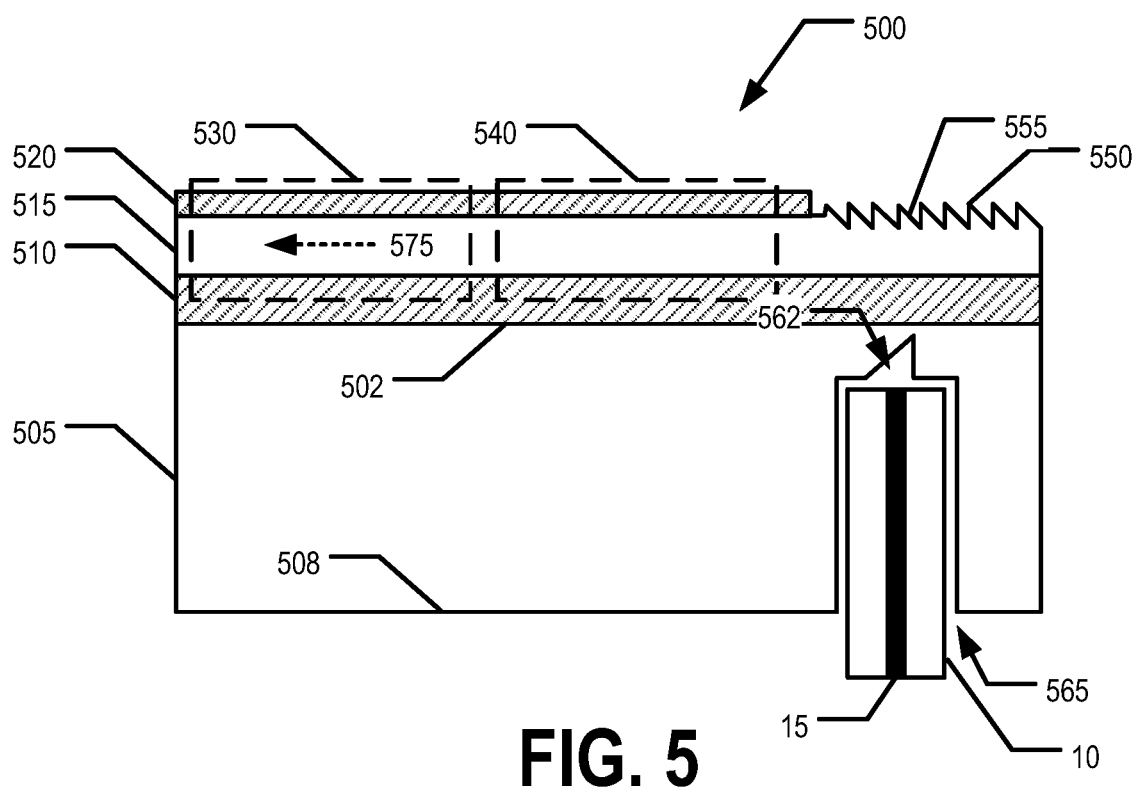

Moreover, the SiP chips 300, 400, 500, 600, 700, 800, 900 may include various numbers of channels each having various numbers of optical inputs and/or outputs, as appropriate for the PIC(s) and the intended application. In an example embodiment, each optical input and/or output includes a similar optical fiber coupling arrangement (e.g., all of the optical inputs and/or outputs may include the optical fiber coupling arrangement illustrated in one of FIG. 1A, 3A, 4, 5, 6, 7, 8, or 9). In an example embodiment, different optical inputs and/or outputs of the SiP chip may be different optical fiber coupling arrangements. For example, an example SiP chip includes an optical fiber coupling as illustrated in FIG. 4 and another optical fiber coupling as illustrated in FIG. 5.

Additionally, FIGS. 3A, 3B, 6, and 9 illustrate example embodiments where the coupling element is a mirror, and FIGS. 4, 5, 7, and 8 illustrate example embodiments where the coupling element is a grating. In various embodiments, optical fiber coupling arrangements similar to those shown in FIGS. 3A, 6 and 9 may incorporate and/or use a grating as a coupling element. Likewise, in various embodiments, optical fiber coupling arrangements similar to those shown in FIGS. 4, 5, 7, and 8 may incorporate and/or use a mirror as a coupling element.

FIG. 3A illustrates a partial cross-section of an example SiP chip 300 along the dotted line shown in FIG. 3B. FIG. 3B provides a partial top view of the example SiP chip 300. The illustrated portion of the SiP chip 300 comprises four channels 360 (e.g., 360A, 360B, 360C, and 360D). Various SiP chips may include fewer or more channels 360, as appropriate for the application. Each channel 360 may include at least one coupling element 350 and a waveguide 330, in the illustrated embodiment. In various embodiments, the waveguide 330 may extend farther than illustrated in FIGS. 3A and 3B and may provide optical signals propagating therethrough to various optical elements (e.g., modulators, phase delay elements, mirrors, lenses, detectors, other waveguides, and/or the like). In various embodiments, the waveguide 330 is a silicon or SiN waveguide or other waveguide configured to propagate optical signals in an appropriate wavelength range for the application.

In the illustrated embodiment, each channel 360 comprises a mode converter 340. In various embodiments, the mode converter 340 is configured to cause a selected mode of the optical signal provided to the coupling element 350 (e.g., via the optical fiber 10) to be coupled into the waveguide 330, while reducing the amplitude of non-selected modes that are propagated through the waveguide 330.

In various embodiments, the SiP chip 300 comprises a first substrate 305, a first cladding layer 310, a waveguide layer 315, and a second cladding layer 320. The layers of the SiP chip 300 are similar to respective ones of the first substrate 105, first cladding layer 110, waveguide layer 115, and second cladding layer 120 of the SiP chip 100 illustrated in FIGS. 1A and 1B. For example, in various embodiments, the first substrate 305 is a silicon substrate and/or comprises silicon. The first cladding layer 310 is formed on a first surface 302 of the first substrate 305 and comprises $SiO_2$ or other oxide, benzocyclobutene (BCB), SiN, one or more dielectric layers, and/or the like, in various embodiments. The waveguide layer 315 may be formed on the first cladding layer 310 and may comprise one or more waveguides and/or other optical components configured to control the propagation of optical signals through the respective PICs, modify the optical signals, and/or use the optical signals as input. For example, the second cladding layer 320 is formed on the waveguide layer 315 such that the waveguide layer 315 is substantially sandwiched between the first cladding layer 310 and the second cladding layer 320 and the PIC(s) formed on the SiP chip 300 is electrically and/or optically isolated from the surrounding environment by the second cladding layer 320. In various embodiments, the second cladding layer 320 comprises $SiO_2$ or other oxide, benzocyclobutene (BCB), SiN, one or more dielectric layers, and/or the like.

Thus, the SiP chip 300 may comprise one or more PIC(s) formed on the first surface 302 of the first substrate 305. The PIC(s) may define respective waveguide propagation directions 375 that are generally in a plane that is substantially parallel to a plane defined by the first surface 302 of the first substrate 305.

One or more cavities 365 may be etched through the second surface 308 of the first substrate 305. The cavities 365 may extend at least partially through the first substrate 305 in a direction that is transverse (e.g., substantially perpendicular) to the plane defined by the first surface 302 of the first substrate 305. In various embodiments, the one or more cavities are formed using laser drilling, wet etching, DRIE, and/or the like.

In various embodiments, each of the one or more cavities are configured to receive at least a portion of a respective optical fiber 10 therein. The respective optical fiber 10 and/or the fiber core 15 of the respective optical fiber 10 may define a fiber propagation direction 370. The fiber propagation direction 370 may be transverse (e.g., substantially orthogonal) to the waveguide propagation direction 375.

Each of the one or more cavities 365 may be aligned with a respective coupling element 350. For example, the SiP chip 300 may include a coupling element 350 for each channel 360, in an example embodiment. In an example embodiment, the SiP chip 300 contains a coupling element 350 for an external optical source and/or an optical receiver associated with the PIC(s) formed on the SiP chip 300. The coupling element 350 is configured to optically couple the fiber core 15 of the respective optical fiber 10 with a respective waveguide 330 (e.g., via mode converter 340).

In various embodiments, a coupling element 350 is configured to change the propagation direction of an optical signal to couple the optical signal provided by the optical fiber 10 (e.g., propagating in the fiber propagation direction 370) into the waveguide 330 (e.g., so that the optical signal is propagating in the waveguide propagation direction 375). In the illustrated embodiment, the coupling element 350 is a mirror. The dotted arrows illustrate how an optical signal exiting the fiber core 15 reflects off of the coupling element (e.g., mirror) 350, reflects off of a surface of the waveguide layer 315 that is adjacent the first cladding layer (e.g., the surface of the waveguide layer 315 most proximate to the first substrate 305) to pass into the mode converter 340 of the respective channel 360. In an example embodiment, the coupling element 350 is a flat or planar mirror that is angled with respect to the optical fiber 10 so as to direct optical signals exiting the optical fiber 10 into the waveguide 330 (e.g., via the mode converter 340) or from the waveguide 330 into the optical fiber 10. In an example embodiment, the coupling element 350 is a curved mirror with a curvature that is configured to direct optical signals exiting the optical fiber 10 into the waveguide 330 (e.g., via the mode converter 340) or from the waveguide 330 into the optical fiber 10. In the illustrated embodiment, an external surface of the mirror is coated with an anti-reflection coating 355. In various embodiments, the coupling element 350 is a mirror configured to reflect the optical signal provided by the optical fiber 10 into the waveguide 330 (e.g., via the mode converter 340).

The optical fiber 10 may be mechanically secured into a cavity 365 such that the optical fiber 10 is optically coupled to an optical component of the SiP chip 300 (e.g., waveguide 330, mode converter 340, and/or the like) via the coupling element 350. In various embodiments, the optical fiber 10 is one of an array of optical fibers that are each mechanically secured into respective cavities 365 of an array of cavities through the second surface 308 of the first substrate 305 with each cavity 365 of the cavity array extending through the second surface 308 of the first substrate 305 and aligned with respective coupling elements 350 of the SiP chip 300 so as to optically couple the optical fibers 10 with respective optical elements of the SiP chip 300 (e.g., respective waveguides 330, respective mode converters 340, and/or the like).

In various embodiments, one or more optical fibers 10 of the array of optical fibers are mechanically secured into a fiber block. The fiber block may provide protection of the optical fibers 10 (e.g., to prevent damage thereto). In various embodiments, the fiber block enables the optical fibers 10 to be removably secured or irremovably secured into the cavity array, as appropriate for the application. In an example embodiment, the fiber block enables the removable or pluggable coupling of the external source and/or receiver, for example. In various embodiments, the fiber block is, comprises, and/or terminates in an MT ferrule, a collimating lens block, and/or other appropriate optical fiber connector, thus allowing detachable connection with a fiber block extension.

FIG. 4 illustrates a partial cross-section of an example SiP chip 400 having a backside (or frontside) optical fiber coupling according to an example embodiment. The SiP chip 400 includes a blazed grating as at least one of the coupling elements 450 and has a chamfered optical fiber 20 comprising a chamfered fiber core 25 secured within the cavity 465.

In various embodiments, the SiP chip 400 comprises a first substrate 405, a first cladding layer 410, a waveguide layer 415, and a second cladding layer 420. The layers of the SiP chip 400 may be similar to respective ones of the first substrate 105, first cladding layer 110, waveguide layer 115, and second cladding layer 120 of the SiP chip 100 illustrated in FIGS. 1A and 1B. For example, in various embodiments, the first substrate 405 is a silicon substrate and/or comprises silicon. The first cladding layer 410 may be formed on a first surface 402 of the first substrate 405 and may comprise $SiO_2$ or other oxide, benzocyclobutene (BCB), SiN, one or more dielectric layers, and/or the like, in various embodiments.

The waveguide layer 415 may be formed on the first cladding layer 410 and may comprise one or more waveguides and/or other optical components configured to control the propagation of optical signals through the respective PICs, modify the optical signals, and/or use the optical signals as input. For example, the second cladding layer 420 may be formed on the waveguide layer 415 such that the waveguide layer 415 is substantially sandwiched between the first cladding layer 410 and the second cladding layer 420 and the PIC(s) formed on the SiP chip 400 is electrically and/or optically isolated from the surrounding environment by the second cladding layer 420. In various embodiments, the second cladding layer 420 comprises $SiO_2$ or other oxide, benzocyclobutene (BCB), SiN, one or more dielectric layers, and/or the like.

Thus, the SiP chip 400 comprises one or more PIC(s) formed on the first surface 402 of the first substrate 405. The PIC(s) may define respective waveguide propagation directions 475 that are generally in a plane that is substantially parallel to a plane defined by the first surface 402 of the first substrate 405. One or more cavities 465 may be etched through the second surface 408 of the first substrate 405 such that the cavities 465 extend at least partially through the first substrate 405 in a direction that is transverse (e.g., substantially perpendicular) to the plane defined by the first surface 402 of the first substrate 405.

In various embodiments, each of the one or more cavities is configured to receive at least a portion of a respective chamfered optical fiber 20 therein. In various embodiments, the chamfer angle of the chamfered optical fiber 20 is determined, based at least in part on the refractive index of the optical fiber 20 (e.g., the refractive index of the fiber core 25), such that the optical signal exiting the chamfered fiber 20 is in a range of 5-15° out of alignment from the fiber propagation direction 470 (e.g., 5-15° out of alignment with the fiber propagation direction 470 and toward the waveguide propagation direct 475). In an example embodiment, the chamfer angle is configured to cause a modification or tilting of the propagation direction of the optical signal such that the optical signal interacts with the coupling element 450 (e.g., a blazed grating) at an appropriate angle for coupling element 450 to couple the optical signal into an optical component within the waveguide layer 415. The respective chamfered optical fiber 20 and/or the chamfered fiber core 25 of the respective chamfered optical fiber 20 may define a fiber propagation direction 470. The fiber propagation direction 470 may be transverse (e.g., substantially orthogonal) to the waveguide propagation direction 475. Each of the one or more cavities 465 may be aligned with a respective coupling element 450. The coupling element 450 may be configured to optically couple the chamfered fiber core 25 of the respective chamfered optical fiber 20 with a respective waveguide 430 (e.g., via mode converter 440).

In the illustrated embodiment, the portion of the chamfered optical fiber 20 that is inserted into the cavity 465 is chamfered and/or angled so as to cause the propagation direction of the optical signal exiting the chamfered optical fiber 20 to be modified to a an angle that will couple to the waveguide (e.g., to the waveguide propagation direction 475) before reaching the coupling element 450. For example, when the optical signal exits the chamfered fiber core 25, the chamfering of the optical fiber 20 may cause the propagation direction of the optical signal to be bent, tilted, and/or modified to an intermediate propagation direction between the fiber propagation direction 475 and the waveguide propagation direction 470.

In various embodiments, the coupling element 450 is configured to further change the propagation direction of the optical signal to couple the optical signal provided by the chamfered optical fiber 20 into the waveguide 430 (e.g., so that the optical signal is propagating in the waveguide propagation direction 475). In the illustrated embodiment, the coupling element 450 is a ruled grating, such as a blazed grating. In various embodiments, a surface of the grating is coated with an anti-reflection coating 455. In an example embodiment, the grating is coated with a metallic coating, such as a gold coating, aluminum coating, and/or the like. In various embodiments, the coupling element 450 is a diffraction grating configured to diffract the optical signal and/or a substantial portion of the optical power of the optical signal provided by the chamfered optical fiber 20 into the waveguide 430 (e.g., via the mode converter 440).

Similar to the optical fiber 10, the chamfered optical fiber 20 may be mechanically secured into a cavity 465 such that the optical fiber 10 is optically coupled to an optical component of the SiP chip 400 (e.g., waveguide 430, mode converter 440, and/or the like) via the coupling element 450. In various embodiments, the chamfered optical fiber 20 is one of an array of chamfered optical fibers 20 or a combination of chamfered and non-chamfered optical fibers 10 that are each mechanically secured into respective cavities 465 of an array of cavities through the second surface 408 of the first substrate 405, with each cavity 465 of the cavity array extending through the second surface 408 of the first substrate 405 and aligned with respective coupling elements 450 of the SiP chip 400 so as to optically couple the chamfered optical fibers 20 and/or non-chamfered optical fibers 10 with respective optical elements of the SiP chip 400 (e.g., respective waveguides 430, respective mode converters 440, and/or the like). In various embodiments, one or more chamfered optical fibers 20 and/or non-chamfered optical fibers 10 of the array of optical fibers are mechanically secured into a fiber block that enables the removable or pluggable coupling of respective external sources and/or receivers, for example, to the PICs formed on the first surface 402 of the first substrate 405 of the SiP chip 400.

FIG. 5 illustrates a partial cross-section of an example SiP chip 500 having a backside (or frontside) optical fiber coupling according to an example embodiment. The SiP chip 500 includes a blazed grating as at least one of the coupling elements 550 and has a cavity 565 with a prismatic end 562.

In various embodiments, the SiP chip 500 comprises a first substrate 505, a first cladding layer 510, a waveguide layer 515, and a second cladding layer 520. The layers of the SiP chip 500 may be similar to respective ones of the first substrate 105, first cladding layer 110, waveguide layer 115, and second cladding layer 120 of the SiP chip 100 illustrated in FIGS. 1A and 1B. For example, in various embodiments, the first substrate 505 is a silicon substrate and/or comprises silicon. The first cladding layer 510 may be formed on a first surface 502 of the first substrate 505 and may comprise $SiO_2$ or other oxide, benzocyclobutene (BCB), SiN, one or more dielectric layers, and/or the like, in various embodiments. The waveguide layer 515 may be formed on the first cladding layer 510 and may comprise one or more waveguides and/or other optical components configured to control the propagation of optical signals through the respective PICs, modify the optical signals, and/or use the optical signals as input. For example, the second cladding layer 520 may be formed on the waveguide layer 515 such that the waveguide layer 515 is substantially sandwiched between the first cladding layer 510 and the second cladding layer 520 and the PIC(s) formed on the SiP chip 500 is electrically and/or optically isolated from the surrounding environment by the second cladding layer 520. In various embodiments, the second cladding layer 520 comprises SiO$_2$ or other oxide, benzocyclobutene (BCB), SiN, one or more dielectric layers, and/or the like.

Thus, the SiP chip 500 may comprise one or more PIC(s) formed on the first surface 502 of the first substrate 505. The PIC(s) define respective waveguide propagation directions 575 that are generally in a plane that is substantially parallel to a plane defined by the first surface 502 of the first substrate 505. One or more cavities 565 are etched through the second surface 508 of the first substrate 505 such that the cavities 565 extend at least partially through the first substrate 505 in a direction that is transverse (e.g., substantially perpendicular) to the plane defined by the first surface 502 of the first substrate 505.

In various embodiments, each of the one or more cavities is configured to receive at least a portion of a respective optical fiber 10 therein. The respective optical fiber 10 and/or the fiber core 15 of the respective optical fiber 10 may define a fiber propagation direction 570. The fiber propagation direction 570 may be transverse (e.g., substantially orthogonal) to the waveguide propagation direction 575. Each of the one or more cavities 565 may be aligned with a respective coupling element 550. The coupling element 550 may be configured to optically couple the fiber core 15 of the respective optical fiber 10 with a respective waveguide 530 (e.g., via mode converter 540).

In the illustrated embodiment, the cavity 565 includes a prismatic end 562. For example, the end of the cavity 565 (e.g., a surface of the cavity 565 closest to the coupling element 550) may be angled, chamfered, and/or prismatic in shape. The prismatic end 562 of the cavity 565 may cause an optical signal propagating therethrough to be tilted to an angle that will couple to the waveguide 530 (e.g., to the waveguide propagation direction 575) before reaching the coupling element 550. In an example embodiment, the shape of the prismatic end 562 is configured to cause a modification or tilting of the propagation direction of the optical signal such that the optical signal interacts with the coupling element 550 (e.g., a blazed grating) at an appropriate angle for coupling element 550 to couple the optical signal into an optical component (e.g., waveguide 530, mode converter 540) within the waveguide layer 515. In an example embodiment, the prismatic end 562 of the cavity 565 is configured to modify the propagation direction of the optical signal by an angle of 5-10° (e.g., ~8°). For example, the optical signal may exit the fiber core 15 propagating substantially in the fiber propagation direction 575 and may then interact with the prismatic end 562 of the cavity 565. The interaction of the optical signal with the prismatic end 562 of the cavity 565 may cause the propagation direction of the optical signal to be bent, tilted, and/or modified to an intermediate propagation direction between the fiber propagation direction 575 and the waveguide propagation direction 570. Interaction of the optical signal with the coupling element 550 may then cause the propagation direction of the optical signal to be further modified to be substantially parallel to the waveguide propagation direction 570. In an example embodiment, the size of the prismatic end 562 is determined based at least in part on the beam profile of the optical signal (e.g., a spot size of the optical signal and/or the like). In various embodiments, the cavity 565 is configured such that the optical signal is emitted directly into the prismatic end 562 from the optical fiber 10 (e.g., the end of the optical fiber 10 is disposed substantially at the mouth of the prismatic end 562).

In the illustrated embodiment, the coupling element 550 is a ruled grating, such as a blazed grating. In various embodiments, a surface of the grating is coated with an anti-reflection coating 555. In an example embodiment, the grating is coated with a metallic coating, such as a gold coating, aluminum coating, and/or the like. In various embodiments, the coupling element 550 is a diffraction grating configured to diffract the optical signal and/or a substantial portion of the optical power of the optical signal provided by the optical fiber 10 into the waveguide 530 (e.g., via the mode converter 540).

In various embodiments, an optical fiber 10 is secured into a cavity 565 such that the optical fiber 10 is optically coupled to an optical component of the SiP chip 500 (e.g., waveguide 530, mode converter 540, and/or the like) via the coupling element 550. In various embodiments, the optical fiber 10 is one of an array of optical fibers 10 that are each mechanically secured into respective cavities 565 of an array of cavities through the second surface 508 of the first substrate 505 with each cavity 565 of the cavity array extending through the second surface 508 of the first substrate 505 and aligned with respective coupling elements 550 of the SiP chip 500 so as to optically couple the optical fibers 10 with respective optical elements of the SiP chip 500 (e.g., respective waveguides 530, respective mode converters 540, and/or the like). In various embodiments, one or more optical fibers 10 of the array of optical fibers are mechanically secured into a fiber block that enables the removable or pluggable coupling of respective external sources and/or receivers, for example, to the PICs formed on the first surface 502 of the first substrate 505 of the SiP chip 500.

Figure 6:
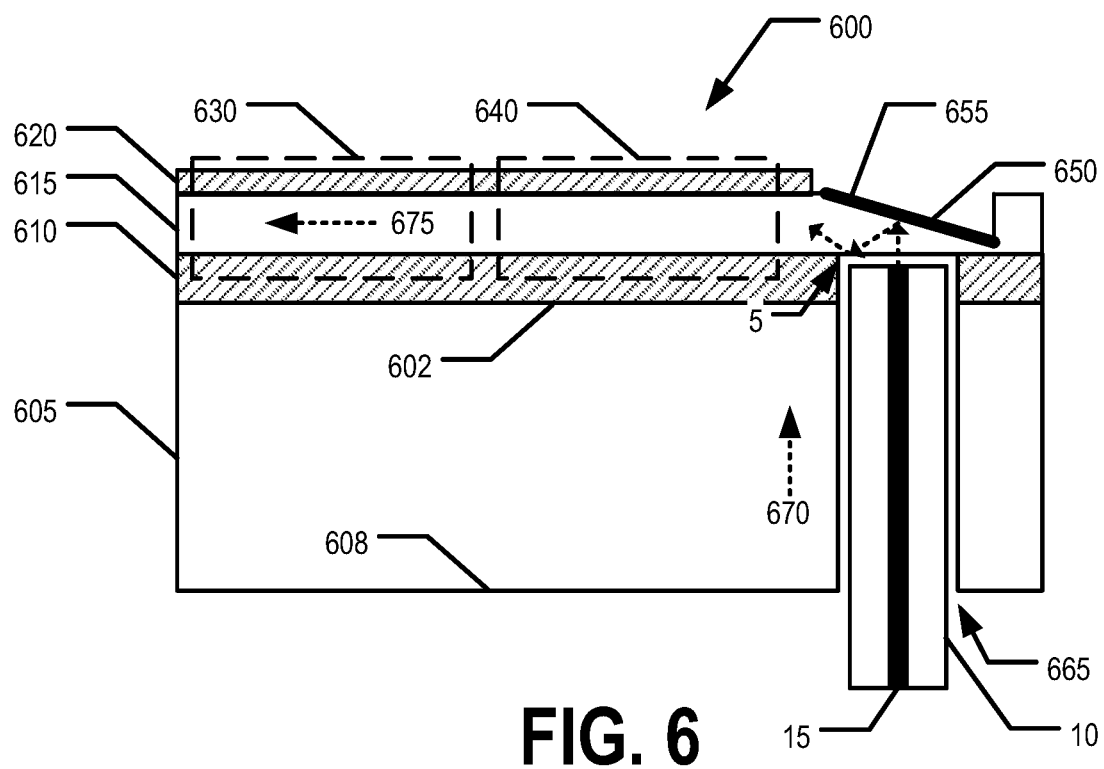

FIG. 6 illustrates a partial cross-section of an example SiP chip 600 having a backside (or frontside) optical fiber coupling according to an example embodiment. The SiP chip 600 includes a mirror as at least one of the coupling elements 650 and the cavity 665 has been etched through the first cladding layer 610.

In various embodiments, the SiP chip 600 comprises a first substrate 605, a first cladding layer 610, a waveguide layer 615, and a second cladding layer 620. The layers of the SiP chip 600 may be similar to respective ones of the first substrate 105, first cladding layer 110, waveguide layer 115, and second cladding layer 120 of the SiP chip 100 illustrated in FIGS. 1A and 1B. For example, in various embodiments, the first substrate 605 is a silicon substrate and/or comprises silicon. The first cladding layer 610 is formed on a first surface 602 of the first substrate 605 and comprises SiO$_2$ or other oxide, benzocyclobutene (BCB), SiN, one or more dielectric layers, and/or the like, in various embodiments. The waveguide layer 615 is formed on the first cladding layer 610 and comprises one or more waveguides and/or other optical components configured to control the propagation of optical signals through the respective PICs, modify the optical signals, and/or use the optical signals as input. For example, the second cladding layer 620 is formed on the waveguide layer 615 such that the waveguide layer 615 is substantially sandwiched between the first cladding layer 610 and the second cladding layer 620 and the PIC(s) formed on the SiP chip 600 are electrically and/or optically isolated from the surrounding environment by the second cladding layer 620. In various embodiments, the second cladding layer 620 comprises SiO$_2$ or other oxide, benzocyclobutene (BCB), SiN, one or more dielectric layers, and/or the like.

Thus, the SiP chip 600 comprises one or more PIC(s) formed on the first surface 602 of the first substrate 605. The PIC(s) define respective waveguide propagation directions 675 that are generally in a plane that is substantially parallel to a plane defined by the first surface 602 of the first substrate 605. One or more cavities 665 are etched through the second surface 608 of the first substrate 605 such that the cavities 665 extend through the first substrate 605 and at least partially through (e.g., completely through in the illustrated embodiment) the first cladding layer 610 in a direction that is transverse (e.g., substantially perpendicular) to the plane defined by the first surface 602 of the first substrate 605.

In various embodiments, each of the one or more cavities are configured to receive at least a portion of a respective optical fiber 10 therein. The respective optical fiber 10 and/or the fiber core 15 of the respective optical fiber 10 defines a fiber propagation direction 670. The fiber propagation direction 670 is transverse (e.g., substantially orthogonal) to the waveguide propagation direction 675. Each of the one or more cavities 665 are aligned with a respective coupling element 650. The coupling element 650 is configured to optically couple the fiber core 15 of the respective optical fiber 10 with a respective waveguide 630 (e.g., via mode converter 640).

As the cavity 665 is etched at least partially through the first cladding layer 610, the end of the optical fiber 10 is disposed in proximity to the coupling element 650. This configuration allows less time for divergence of the optical signal before the optical signal reaches the coupling element and allows for and/or enables less scattering or depletion of the optical signal by the first cladding layer 610.

In the illustrated embodiment, the coupling element 650 is a mirror. The dotted arrows illustrate how an optical signal exiting the fiber core 15 reflects off of the coupling element (e.g., mirror) 650, reflects off of a surface of the waveguide layer 615 that is adjacent to the first cladding layer (e.g., the surface of the waveguide layer 615 most proximate to the first substrate 605) and into the mode converter 640, in an example embodiment. In an example embodiment, the coupling element 650 is a flat or planar mirror that is angled with respect to the fiber propagation direction 675 and/or the waveguide propagation direction 670 so as to direct optical signals exiting the optical fiber 10 into the waveguide 630 (e.g., via the mode converter 640) or from the waveguide 630 into the optical fiber 10. In an example embodiment, the coupling element 650 is a curved mirror with a curvature that is configured to direct optical signals exiting the optical fiber 10 into the waveguide 630 (e.g., via the mode converter 640) or from the waveguide 630 into the optical fiber 10. In the illustrated embodiment, an external surface of the mirror is coated with an anti-reflection coating 655. In various embodiments, the coupling element 650 is a mirror configured to reflect the optical signal provided by the optical fiber 10 into the waveguide 630 (e.g., via the mode converter 640).

In various embodiments, an optical fiber 10 is secured into a cavity 665 such that the optical fiber 10 is optically coupled to an optical component of the SiP chip 600 (e.g., waveguide 630, mode converter 640, and/or the like) via the coupling element 650. In various embodiments, the optical fiber 10 is one of an array of optical fibers 10 that are each mechanically secured into respective cavities 665 of an array of cavities through the second surface 608 of the first substrate 605 with each cavity 665 of the cavity array extending through the second surface 608 of the first substrate 605 and aligned with respective coupling elements 650 of the SiP chip 600 so as to optically couple the optical fibers 10 with respective optical elements of the SiP chip 600 (e.g., respective waveguides 630, respective mode converters 640, and/or the like). In various embodiments, one or more optical fibers 10 of the array of optical fibers are mechanically secured into a fiber block that enables the removable or pluggable coupling of respective external sources and/or receivers, for example, to the PICs formed on the first surface 602 of the first substrate 605 of the SiP chip 600.

Figure 7:
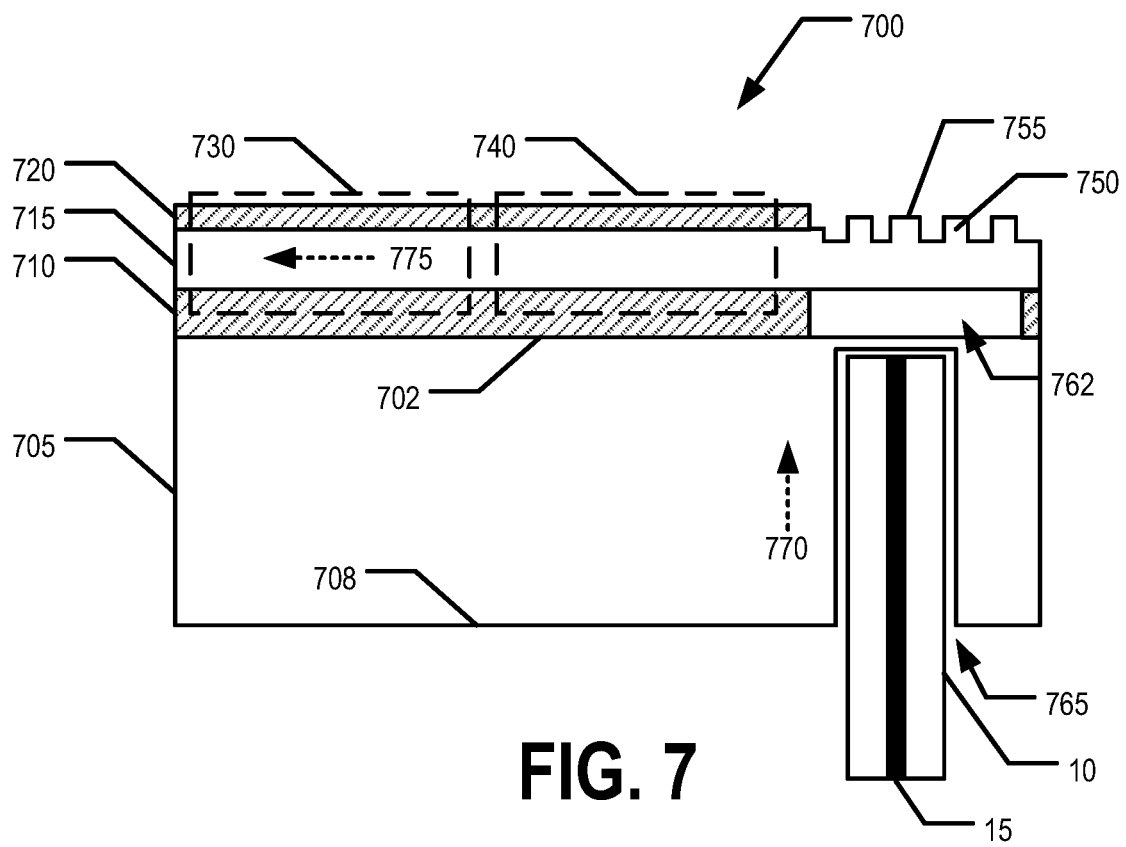

FIG. 7 illustrates a partial cross-section of an example SiP chip 700 having a backside (or frontside) optical fiber coupling according to an example embodiment. The SiP chip 700 includes a grating as at least one of the coupling elements 750 and a portion of the material of the first cladding layer 715 (e.g., a portion disposed between the coupling element 750 and the cavity 765) has been removed.

In various embodiments, the SiP chip 700 comprises a first substrate 705, a first cladding layer 710, a waveguide layer 715, and a second cladding layer 720. The layers of the SiP chip 700 may be similar to respective ones of the first substrate 105, first cladding layer 110, waveguide layer 115, and second cladding layer 120 of the SiP chip 100 illustrated in FIGS. 1A and 1B. For example, in various embodiments, the first substrate 705 is a silicon substrate and/or comprises silicon. The first cladding layer 710 is formed on a first surface 702 of the first substrate 705 and comprises SiO$_2$ or other oxide, benzocyclobutene (BCB), SiN, one or more dielectric layers, and/or the like, in various embodiments. The waveguide layer 715 is formed on the first cladding layer 710 and comprises one or more waveguides and/or other optical components configured to control the propagation of optical signals through the respective PICs, modify the optical signals, and/or use the optical signals as input. For example, the second cladding layer 720 is formed on the waveguide layer 715 such that the waveguide layer 715 is substantially sandwiched between the first cladding layer 710 and the second cladding layer 720 and the PIC(s) formed on the SiP chip 700 are electrically and/or optically isolated from the surrounding environment by the second cladding layer 720. In various embodiments, the second cladding layer 720 comprises SiO$_2$ or other oxide, benzocyclobutene (BCB), SiN, one or more dielectric layers, and/or the like.

Thus, the SiP chip 700 comprises one or more PIC(s) formed on the first surface 702 of the first substrate 705. The PIC(s) define respective waveguide propagation directions 775 that are generally in a plane that is substantially parallel to a plane defined by the first surface 702 of the first substrate 705. One or more cavities 765 are etched through the second surface 708 of the first substrate 705 such that the cavities 765 extend at least partially through the first substrate 705 in a direction that is transverse (e.g., substantially perpendicular) to the plane defined by the first surface 702 of the first substrate 705.

In various embodiments, each of the one or more cavities are configured to receive at least a portion of a respective optical fiber 10 therein. The respective optical fiber 10 and/or the fiber core 15 of the respective optical fiber 10 defines a fiber propagation direction 770. The fiber propagation direction 770 is transverse (e.g., substantially orthogonal) to the waveguide propagation direction 775. Each of the one or more cavities 765 are aligned with a respective coupling element 750. The coupling element 750 is configured to optically couple the fiber core 15 of the respective optical fiber 10 with a respective waveguide 730 (e.g., via mode converter 740).

In the SiP chip 700, a portion of the material of the first cladding layer 710 has been removed to form a gas space 762 (e.g., filled with air and/or another gas). The gas space is disposed between the optical fiber 10 and the coupling element 750 such that an optical signal coupled into and/or out of the optical fiber 10 and out of and/or into the waveguide 730 (e.g., via the mode converter 740) via the coupling element 750 passes through the gas space 762. This configuration allows for and/or results in less scattering or depletion of the optical signal by the first cladding layer 710.

In the illustrated embodiment, the coupling element 750 is a grating. In an example embodiment, the coupling element 750 is a ruled grating, such as a blazed grating. In various embodiments, a surface of the grating is coated with an anti-reflection coating 755. In an example embodiment, the grating is coated with a metallic coating, such as a gold coating, aluminum coating, and/or the like. In various embodiments, the coupling element 750 is a diffraction grating configured to diffract the optical signal and/or a substantial portion of the optical power of the optical signal provided by the optical fiber 10 into the waveguide 730 (e.g., via the mode converter 740).

In various embodiments, an optical fiber 10 is secured into a cavity 765 such that the optical fiber 10 is optically coupled to an optical component of the SiP chip 700 (e.g., waveguide 730, mode converter 740, and/or the like) via the coupling element 750. In various embodiments, the optical fiber 10 is one of an array of optical fibers 10 that are each mechanically secured into respective cavities 765 of an array of cavities through the second surface 708 of the first substrate 705 with each cavity 765 of the cavity array extending through the second surface 708 of the first substrate 705 and aligned with respective coupling elements 750 of the SiP chip 700 so as to optically couple the optical fibers 10 with respective optical elements of the SiP chip 700 (e.g., respective waveguides 730, respective mode converters 740, and/or the like). In various embodiments, one or more optical fibers 10 of the array of optical fibers are mechanically secured into a fiber block that enables the removable or pluggable coupling of respective external sources and/or receivers, for example, to the PICs formed on the first surface 702 of the first substrate 705 of the SiP chip 700.

Figure 8:
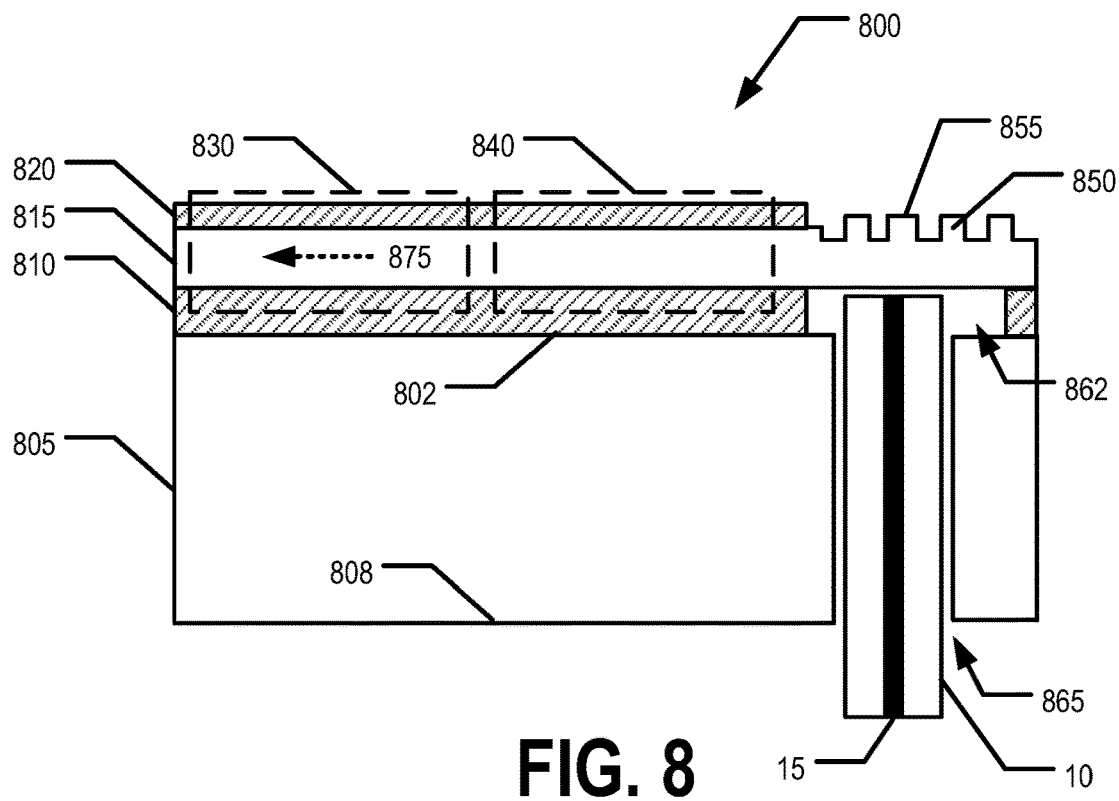

FIG. 8 illustrates a partial cross-section of an example SiP chip 800 having a backside (or frontside) optical fiber coupling according to an example embodiment. The SiP chip 800 is similar to the SiP chip 700 illustrated in FIG. 7, but the cavity 865 is etched completely through the first substrate 805 and a portion of the material of the first cladding layer 815 (e.g., a portion disposed between the coupling element 850 and the cavity 865) has been removed.

In various embodiments, the SiP chip 800 comprises a first substrate 805, a first cladding layer 810, a waveguide layer 815, and a second cladding layer 820. The layers of the SiP chip 800 may be similar to respective ones of the first substrate 105, first cladding layer 110, waveguide layer 115, and second cladding layer 120 of the SiP chip 100 illustrated in FIGS. 1A and 1B. For example, in various embodiments, the first substrate 805 is a silicon substrate and/or comprises silicon. The first cladding layer 810 is formed on a first surface 802 of the first substrate 805 and comprises $SiO_2$ or other oxide, benzocyclobutene (BCB), SiN, one or more dielectric layers, and/or the like, in various embodiments. The waveguide layer 815 is formed on the first cladding layer 810 and comprises one or more waveguides and/or other optical components configured to control the propagation of optical signals through the respective PICs, modify the optical signals, and/or use the optical signals as input. For example, the second cladding layer 820 is formed on the waveguide layer 815 such that the waveguide layer 815 is substantially sandwiched between the first cladding layer 810 and the second cladding layer 820 and the PIC(s) formed on the SiP chip 800 are electrically and/or optically isolated from the surrounding environment by the second cladding layer 820. In various embodiments, the second cladding layer 820 comprises $SiO_2$ or other oxide, benzocyclobutene (BCB), SiN, one or more dielectric layers, and/or the like.

Thus, the SiP chip 800 comprises one or more PIC(s) formed on the first surface 802 of the first substrate 805. The PIC(s) define respective waveguide propagation directions 875 that are generally in a plane that is substantially parallel to a plane defined by the first surface 802 of the first substrate 805. One or more cavities 865 are etched through the second surface 808 of the first substrate 805 such that the cavities 865 extend completely through the first substrate 805 in a direction that is transverse (e.g., substantially perpendicular) to the plane defined by the first surface 802 of the first substrate 805.

In various embodiments, each of the one or more cavities are configured to receive at least a portion of a respective optical fiber 10 therein. The respective optical fiber 10 and/or the fiber core 15 of the respective optical fiber 10 defines a fiber propagation direction 870. The fiber propagation direction 870 is transverse (e.g., substantially orthogonal) to the waveguide propagation direction 875. Each of the one or more cavities 865 are aligned with a respective coupling element 850. The coupling element 850 is configured to optically couple the fiber core 15 of the respective optical fiber 10 with a respective waveguide 830 (e.g., via mode converter 840).

In the SiP chip 800, a portion of the material of the first cladding layer 810 has been removed to form a gas space 862 (e.g., filled with air and/or another gas). In an example embodiment, at least a portion of the gas space 862 is disposed between the optical fiber 10 and the coupling element 850 such that an optical signal coupled into and/or out of the optical fiber 10 and out of and/or into the waveguide 830 (e.g., via the mode converter 840) via the coupling element 850 passes through the gas space 862. In an example embodiment, the optical fiber 10 is secured within the cavity 865 such that the optical fiber abuts and/or is adjacent to the waveguide layer 815. For example, in an example embodiment, the optical fiber 10 is secured into the cavity 865 such that an optical signal coupled into and/or out of the optical fiber 10 and out of and/or into the waveguide 830 (e.g., via the mode converter 840) via the coupling element 850 substantially does not pass through the gas space 862 (e.g., the optical signal is emitted from the optical fiber 10 directly through the interface between the first cladding layer 810 and/or the gas space 862 and the waveguide layer 815). Such configurations (e.g., where the optical fiber 10 and/or the cavity 865 extends completely through the first substate 805 and the material of a portion of the first cladding layer 810 is removed) allows for and/or results in less scattering or depletion of the optical signal by the first cladding layer 810 and provides less time for dispersion of the optical signal as the optical signal propagates between the fiber core 15 and the coupling element 850.

In the illustrated embodiment, the coupling element 850 is a grating. In an example embodiment, the coupling element 850 is a ruled grating, such as a blazed grating. In various embodiments, a surface of the grating is coated with an anti-reflection coating 855. In an example embodiment, the grating is coated with a metallic coating, such as a gold coating, aluminum coating, and/or the like. In various embodiments, the coupling element 850 is a diffraction grating configured to diffract the optical signal and/or a substantial portion of the optical power of the optical signal provided by the optical fiber 10 into the waveguide 830 (e.g., via the mode converter 840).

In various embodiments, an optical fiber 10 is secured into a cavity 865 such that the optical fiber 10 is optically coupled to an optical component of the SiP chip 800 (e.g., waveguide 830, mode converter 840, and/or the like) via the coupling element 850. In various embodiments, the optical fiber 10 is one of an array of optical fibers 10 that are each mechanically secured into respective cavities 865 of an array of cavities through the second surface 808 of the first substrate 805 with each cavity 865 of the cavity array extending through the second surface 808 of the first substrate 805 and aligned with respective coupling elements 850 of the SiP chip 800 so as to optically couple the optical fibers 10 with respective optical elements of the SiP chip 800 (e.g., respective waveguides 830, respective mode converters 840, and/or the like). In various embodiments, one or more optical fibers 10 of the array of optical fibers are mechanically secured into a fiber block that enables the removable or pluggable coupling of respective external sources and/or receivers, for example, to the PICs formed on the first surface 802 of the first substrate 805 of the SiP chip 800.

Figure 9:
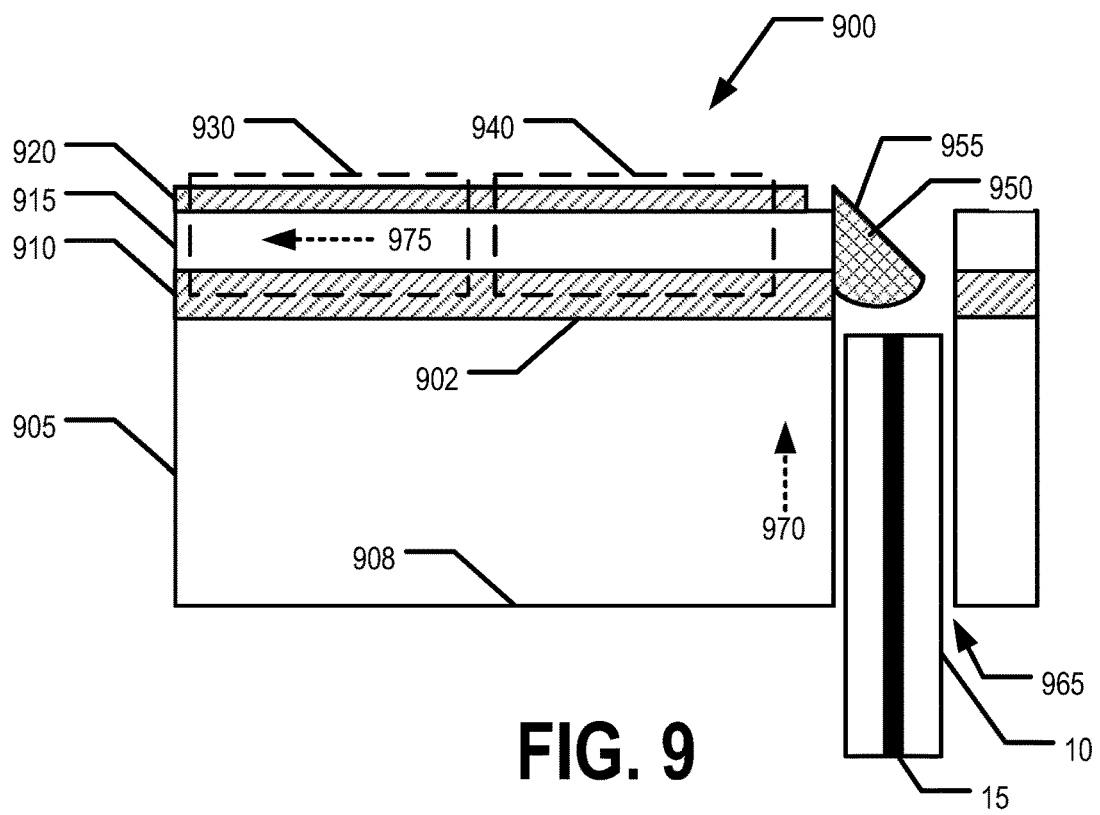

FIG. 9 illustrates a partial cross-section of an example SiP chip 900 having a backside (or frontside) optical fiber coupling according to an example embodiment. The SiP chip 900 includes a cavity 965 that is etched completely through the first substrate 905, the first cladding layer 910, the waveguide layer 915, and the second cladding layer 920. A coupling element 950 is then 3D printed and/or otherwise formed at least partially within the cavity 965 such that an optical fiber 10 inserted into and/or secured within the cavity 965 can provide and/or receive an optical signal to/from the waveguide 930 (e.g., via the mode converter 940) via the coupling element 950.

In various embodiments, the SiP chip 900 comprises a first substrate 905, a first cladding layer 910, a waveguide layer 915, and a second cladding layer 920. The layers of the SiP chip 900 may be similar to respective ones of the first substrate 105, first cladding layer 110, waveguide layer 115, and second cladding layer 120 of the SiP chip 100 illustrated in FIGS. 1A and 1B. For example, in various embodiments, the first substrate 905 is a silicon substrate and/or comprises silicon. The first cladding layer 910 is formed on a first surface 902 of the first substrate 905 and comprises $SiO_2$ or other oxide, benzocyclobutene (BCB), SiN, one or more dielectric layers, and/or the like, in various embodiments. The waveguide layer 915 is formed on the first cladding layer 910 and comprises one or more waveguides and/or other optical components configured to control the propagation of optical signals through the respective PICs, modify the optical signals, and/or use the optical signals as input. For example, the second cladding layer 920 is formed on the waveguide layer 915 such that the waveguide layer 915 is substantially sandwiched between the first cladding layer 910 and the second cladding layer 920 and the PIC(s) formed on the SiP chip 900 are electrically and/or optically isolated from the surrounding environment by the second cladding layer 920. In various embodiments, the second cladding layer 920 comprises $SiO_2$ or other oxide, benzocyclobutene (BCB), SiN, one or more dielectric layers, and/or the like.

Thus, the SiP chip 900 comprises one or more PIC(s) formed on the first surface 902 of the first substrate 905. The PIC(s) define respective waveguide propagation directions 975 that are generally in a plane that is substantially parallel to a plane defined by the first surface 902 of the first substrate 905. One or more cavities 965 are etched through the second surface 808 of the first substrate 905 such that the cavities 965 extend completely through the first substrate 905, through the first cladding layer 910, through the waveguide layer 915, and through the second cladding layer 920 in a direction that is transverse (e.g., substantially perpendicular) to the plane defined by the first surface 902 of the first substrate 905. As illustrated in FIG. 9, the one or more cavities 965 are through holes etched and/or formed completely through the SiP chip 900 in a direction that is transverse (e.g., substantially perpendicular) to the plane defined by the first surface 902 of the first substrate 905 and a direction that is substantially parallel to and/or defines the fiber propagation direction 970.

In various embodiments, each of the one or more cavities are configured to receive at least a portion of a respective optical fiber 10 therein. The respective optical fiber 10 and/or the fiber core 15 of the respective optical fiber 10 defines a fiber propagation direction 970. The fiber propagation direction 970 is transverse (e.g., substantially orthogonal) to the waveguide propagation direction 975. Each of the one or more cavities 965 are aligned with a respective coupling element 950. The coupling element 950 is configured to optically couple the fiber core 15 of the respective optical fiber 10 with a respective waveguide 930 (e.g., via mode converter 940).

In the illustrated embodiment, the coupling element 950 is a 3D printed mirror. For example, after the SiP chip 900 is formed by (a) forming or fabricating the one or more PICs of the SiP chip 900 on the first surface 902 of the first substrate 905, (b) forming or etching the one or more cavities 965 through the SiP chip 900 (e.g., through the first substrate 905, first cladding layer 910, waveguide layer 915, and the second cladding layer 920), and (c) then 3D printing or otherwise forming the coupling elements 950 at least partially into respective cavities 965. In an example embodiment, the coupling element 950 is a flat or planar mirror that is angled with respect to the fiber propagation direction 975 and/or the waveguide propagation direction 970 so as to direct optical signals exiting the optical fiber 10 into the waveguide 930 (e.g., via the mode converter 940) or from the waveguide 930 into the optical fiber 10. In an example embodiment, the coupling element 950 is a curved mirror with a curvature that is configured to direct optical signals exiting the optical fiber 10 into the waveguide 930 (e.g., via the mode converter 940) or from the waveguide 930 into the optical fiber 10. In the illustrated embodiment, an external surface of the mirror is coated with an anti-reflection coating 955. In various embodiments, the coupling element 950 is a mirror configured to reflect the optical signal provided by the optical fiber 10 into the waveguide 930 (e.g., via the mode converter 940). In an example embodiment, the coupling element 950 is a 3D printed grating, ruled grating, or blazed grating.

In various embodiments, an optical fiber 10 is secured into a cavity 965 such that the optical fiber 10 is optically coupled to an optical component of the SiP chip 900 (e.g., waveguide 930, mode converter 940, and/or the like) via the coupling element 950. In various embodiments, the optical fiber 10 is one of an array of optical fibers 10 that are each mechanically secured into respective cavities 965 of an array of cavities through the second surface 908 of the first substrate 905 with each cavity 965 of the cavity array extending through the second surface 908 of the first substrate 905 and aligned with respective coupling elements 950 of the SiP chip 900 so as to optically couple the optical fibers 10 with respective optical elements of the SiP chip 900 (e.g., respective waveguides 930, respective mode converters 940, and/or the like). In various embodiments, one or more optical fibers 10 of the array of optical fibers are mechanically secured into a fiber block that enables the removable or pluggable coupling of respective external sources and/or receivers, for example, to the PICs formed on the first surface 902 of the first substrate 905 of the SiP chip 900.

Example Detachable Fiber Connection Arrangement

FIG. 10 illustrates an example detachable fiber connection arrangement 1000. The detachable fiber connection arrangement 1000 may comprise a mounted, fiber-coupled SiP chip 1060. The mounted, fiber-coupled SiP chip 1060 may comprise an SiP chip 1040 mounted to a second substrate 1030 and having a plurality of first optical fibers 10 secured into respective cavities 1065 (e.g., 1065A, 1065B). In an example embodiment, the SiP chip 1040 is flip chip mounted to the second substrate 1030.

The SiP chip 1040 may comprise a first substrate 1005, a first cladding layer 1010, a waveguide layer 1015, a second cladding layer 1020, and a plurality of coupling elements 1050 (e.g., 1050A, 1050B). Each of the plurality of coupling elements 1050 may be configured to couple respective optical fibers to respective optical inputs and/or outputs of the PICs formed on the SiP chip 1040.

The plurality of first optical fibers 10 may be mounted in and/or secured into respective first coupling positions of a first fiber block 1016. In an example embodiment, the first fiber block 1016 comprises and/or terminates in an MT ferrule. In various embodiments, first linking optical components 1018 (e.g., 1018A, 1018B) may be formed on and/or secured to the first fiber block 1016. In an example embodiment, the first linking optical components 1018 are lenses. For example, a first linking optical component 1018 may be formed to focus an optical signal incident on the first linking optical component into a respective first optical fiber 10. In an example embodiment, each first optical fiber 10 of the plurality of first optical fibers is associated with a respective first linking optical component 1018 configured to focus optical signals incident thereon into the first optical fiber 10. In an example embodiment, a first optical fiber has a length that is substantially equal to a depth of the respective one of the plurality of cavities plus a depth of the first fiber block.

The detachable fiber connection arrangement 1000 further comprises a coupling fiber block 1080. The coupling fiber block 1080 may comprise a second fiber block 1086 having a plurality of second optical fibers 1084 (e.g., 1084A, 1084B) mechanically secured therein at respective second coupling positions. In an example embodiment, the second fiber block 1086 comprises and/or terminates in an MT ferrule. In an example embodiment, a plurality of second linking optical elements 1088 (e.g., 1088A, 1088B) may be formed on and/or secured to the second fiber block 1086. In an example embodiment, the second linking optical elements 1088 are lenses. For example, a second linking optical element 1088 may be formed to focus an optical signal exiting the respective external source/receiver optical fiber 1084 toward a respective first linking optical element 1018 of the first fiber block 1016. In an example embodiment, each second optical fiber 1084 of the plurality of second optical fibers mechanically secured into the second fiber block 1086 may be associated with a respective second linking optical element 1088. As should be understood, the respective optical paths formed by the coupling elements 1050, first optical fibers 10, first linking optical elements 1018, second linking optical elements 1088, and second optical fibers 1084 may be used to propagate optical signals to the PICs formed on the SiP chip 1040 or from the PICs formed on the SiP chip 1040.

The second fiber block 1086 may be mechanically secured to one or more elements of a device, apparatus, and/or system and the second optical fibers 1084 may be optically coupled to respective external sources and/or receivers to receive and/or provide respective optical signals therefrom/thereto, as appropriate for the application.

The detachable fiber connection arrangement 1000 may therefore provide a pluggable solution that prevents the used of easily breakable/damageable fiber pigtails while enabling optical connection between PICs formed on an SiP chip and external optical sources configured to provide optical signals to one or more PICs and/or optical receivers configured to receive optical signals from one or more PICs.

FIG. 11 provides a flowchart illustrating various processes, procedures, operations, and/or the like for fabricating a detachable fiber connection arrangement 1000, according to an example embodiment. Staring at step/operation 1102, the SiP chip 1040 is fabricated. For example, the SiP chip 1040 may be fabricated to have one or more PICs formed on a first surface 1002 of a first substrate 1005 of the SiP chip 1040. For example, the PICs formed on the SiP chip 1040 may be organized into one or more channels and/or comprise waveguides, mode converters, and/or other optical elements. The SiP chip 1040 may comprise one or more coupling elements 1050 each associated with one or more optical elements (e.g., waveguides, mode converters) of a respective PIC. For example, coupling elements 1050 may be located at various input and/or output locations of the PIC(s) formed on the SiP chip 1040.

At step/operation 1104, a cavity array is etched and/or formed through the second surface 1008 of the first substrate 1005. The second surface 1008 of the first substrate 1005 may be an opposing surface of the first substrate 1005 with respect to the first surface 1002 of the first substrate 1005. In various embodiments, the second surface 1008 is opposite the first surface 1002 of the first substrate. In various embodiments, the array of cavities (e.g., comprising the plurality of cavities 1065) is formed using laser drilling, wet etching, DRIE, and/or the like. In various embodiments, the array of cavities is formed and/or etched such that respective cavities 1065 of the cavity array align with respective coupling elements 1050 of the SiP chip 1040.

In various embodiments, the one or more cavities 1065 extend partially through the first substrate 1005 (see FIGS. 1A, 3A, 4, 5, and 7). In various embodiments, the one or more cavities 1065 extend through the first surface 1002 of the first substate 1005 (see FIGS. 6, 8, and 9). In various embodiments, the one or more cavities 1065 extend at least partially through the first cladding layer 1010. In an example embodiment, the one or more cavities 1065 extend through the first substrate 1005, the first cladding layer 1010, the waveguide layer 1015, and the second cladding 1020 (see FIG. 9). In various embodiments, the cavities 1065 are formed and/or etched to a depth that is appropriate for the application. In an example embodiment, the SiP chip 1040 is flip chip mounted and/or otherwise mounted to a second substrate 1030.

At step/operation 1106, a first fiber block 1016 is formed, fabricated, prepared, and/or the like. The first fiber block 1016 may comprise first coupling positions that are through holes through the first fiber block 1016. Respective first coupling positions are arranged and/or configured to align with respective cavities 1065 of the cavity array of the SiP chip 1040. First optical fibers 10 may be secured into respective first coupling positions.

As described above with respect to FIGS. 2A, 2B, and 2C, in various embodiments, the cavities 1065 of the cavity array and/or the first coupling positions of the first fiber block 1016 may be configured and/or shaped to guide a first optical fiber 10 inserted therein into proper alignment with the respective coupling element 1050. For example, the shape of the cavities 1065 and/or the through holes of the coupling positions, taken in a cross-section taken substantially parallel to the plane defined by the first surface 1002 of the first substrate 1005, may be round, elliptical, triangular, square, polygonal, regular, and/or irregular such that the shape of the cavities 1065 and/or through holes are configured for the first optical fiber 10 inserted therein to have two points of contact with respective edges of the respective cavity and/or through hole to align the respective fiber core 15 appropriately with respect to the respective coupling element 1050 and, possibly, to provide structural support to the optical fiber 10.

At step/operation 1108, the first linking optical elements 1018 are formed and secured to the appropriate positions (e.g., in alignment with respective first coupling positions) of the first fiber block 1016. For example, the first linking optical elements 1018 are lenses or other optical elements configured to focus and/or direct optical signals incident thereon into a respective first optical fiber disposed within a respective through hole of a respective coupling position.

At step/operation 1110, the first optical fibers 10 secured into the first fiber block 1016 are secured into respective cavities 1065 of the cavity array of the SiP chip 1040. In various embodiments, the first optical fibers 10 are secured into respective cavities 1065 of the cavity array of the SiP chip 1040 such that respective first optical fibers 10 are aligned with respective coupling elements 1050. The first fiber block 1016 may be secured to the first substrate 1005. For example, the first fiber block 1016 may be secured to the first substrate 1005 to prevent movement of the first optical fibers 10 with respect to the cavity array and/or to prevent misalignment of respective first optical fibers 10 with respect to the respective coupling elements 1050.

At step/operation 1112, a coupling fiber block 1080 is formed by forming, fabricating, preparing, and/or the like a second fiber block 1086 and securing the second optical fibers 1084 therein. The second fiber block 1086 may comprise second coupling positions that are through holes through the second fiber block 1086. Respective second coupling positions may be arranged and/or configured to align with respective first coupling positions of the first fiber block 1016. Second optical fibers 1084 may be secured into respective second coupling positions.

In various embodiments, the through holes of the second coupling positions of the second fiber block 1086 may be configured and/or shaped to guide a second optical fiber 1084 inserted therein into proper alignment with the respective first optical fiber 10 (e.g., possibly via first and/or second linking optical elements 1018, 1088). For example, the shape of the through holes of the second coupling positions, taken in a cross-section taken substantially parallel to a surface of the second fiber block 1080 configured to be substantially parallel to the first surface 1002 of the first substrate 1005 when the second optical fibers 1084 are in optical communication with respective ones of the first optical fibers 10, may be round, elliptical, triangular, square, polygonal, regular, and/or irregular such that the shape of the through holes is configured for the second optical fiber 1084 inserted therein to have two points of contact with respective edges of the respective through hole to align the respective fiber core appropriately with respect to the respective second linking optical element 1088 and/or first optical fiber 10 and, possibly, to provide structural support to the second optical fiber 1084.

At step/operation 1114, the second linking optical elements 1088 are formed and/or secured to the appropriate positions (e.g., in alignment with respective second coupling positions) of the second fiber block 1086. For example, the second linking optical elements 1088 may be lenses or other optical elements configured to focus and/or direct optical signals incident thereon into a respective second optical fiber disposed within a respective through hole of a respective coupling position and/or to disperse the optical signal such that a substantial portion of the optical power of the optical signal is incident on a respective first linking optical element 1018 and/or first optical fiber 10.

At step/operation 1116, the coupling fiber block 1080 is secured with respect to the first fiber block 1016 (and/or with respect to the mounted, fiber-coupled SiP chip 1060). For example, the coupling fiber block 1080 may be secured to one or more devices, apparatuses, system components and/or the like such that the second optical fibers 1084 are in optical communication with respective ones of the first optical fibers such that the second optical fibers 1084 and first optical fibers 10 provide optical paths for providing optical signals generated by external optical sources to one or more PICs formed on the SiP chip 1040 and/or for providing optical signals from one or more PICs formed on the SiP chip 1040 to external optical receivers. In an example embodiment, the coupling fiber block 1080 (e.g., the second fiber block 1086) is mechanically coupled to the first fiber block 1016 in a selectively detachable manner.

Example Connector for Backside (or Frontside) Optical Fiber Coupling

FIGS. 12 and 13 provide partial cross-sections of example SiP chips 1200, 1300 configured for backside (or frontside) optical fiber coupling that are flip chip mounted to respective second substrates 1230, 1330 (via respective solder bumps 1225, 1325) and that have backside (or frontside) optical fiber couplings facilitated by respective connectors 1200, 1300.

In various embodiments, the SiP chips 1240, 1340 are similar to SiP chips 100, 300, 400, 500, 600, 700, 800, 900, and/or 1040. For example, SiP chips 1240, 1340 may comprise respective first substrates 1205, 1305, first cladding layers 1210, 1310, waveguide layers 1215, 1315, and second cladding layers 1220, 1320. The layers of the respective SiP chips 1240, 1340 may be similar to respective ones of the first substrate 105, first cladding layer 110, waveguide layer 115, and second cladding layer 120 of the SiP chip 100 illustrated in FIGS. 1A and 1B, in various embodiments. For example, in various embodiments, the respective first substrates 1205, 1305 are silicon substrates and/or comprise silicon. The respective first cladding layers 1210, 1310 may be formed on respective first surfaces 1202, 1302 of the respective first substrate 1205, 1305 and may comprise $SiO_2$ or other oxide, benzocyclobutene (BCB), SiN, one or more dielectric layers, and/or the like, in various embodiments. The respective waveguide layers 1215, 1315 may be formed on the respective first cladding layers 1210, 1310 and may comprise one or more waveguides and/or other optical components configured to control the propagation of optical signals through the respective PICs, modify the optical signals, and/or use the optical signals as input. For example, the respective second cladding layers 1220, 1320 may be formed on the respective waveguide layers 1215, 1315 such that the respective waveguide layers 1215, 1315 are substantially sandwiched between the respective first cladding layer 1210, 1310 and the respective second cladding layer 1220, 1320 and the PIC(s) formed on the SiP chips 1240, 1340 may be electrically and/or optically isolated from the surrounding environment by the respective second cladding layers 1220, 1320. In various embodiments, the respective second cladding layers 1220, 1320 comprise $SiO_2$ or other oxide, benzocyclobutene (BCB), SiN, one or more dielectric layers, and/or the like.

In various embodiments, a respective connector 1255, 1355 is coupled and/or mechanically secured to a respective second surface 1208, 1308 of the respective first substrate 1205, 1305. In various embodiments, the connector 1255, 1355 may comprise a respective optical fiber interfacing component 1270, 1370 and a respective waveguide interfacing component 1254, 1354. In various embodiments, the optical fiber interfacing component 1270 comprises a fiber coupling component. In the illustrated embodiment, the fiber coupling component is cavity 1272 configured to receive an optical fiber 10 therein. In various embodiments, the optical fiber interfacing component 1270 comprise a plurality (e.g., an array) of fiber coupling components. For example, in an example embodiment, the optical fiber interfacing component comprises a plurality (e.g., an array) of cavities 1272 with each cavity configured to receive a respective optical fiber 10 therein.

In various embodiments, the connector 1255, 1355 comprises a connector optical element 1275, 1375. The connector optical element 1275, 1375 may be a mirror (e.g., an angled mirror, curved mirror and/or the like), a grating (e.g., a ruled grating, blazed grating, and/or the like), or other optical element configured to couple (e.g., reflect, diffract, and/or the like) light exiting the fiber core 15 of the optical fiber 10 (e.g., propagating in a connector propagation direction 1282) to an optical path in the path propagation direction 1284. In various embodiments, the optical path extends between the connector optical element 1275, 1375 and a coupling element 1250, 1350 of the SiP chip 1240, 1340. In various embodiments, the optical path passes through a portion of the optical fiber interfacing component 1270, 1370, the waveguide interfacing component 1254, 1354, and a portion of the SiP chip 1240, 1340 to the coupling element 1250, 1350. The coupling element 1250, 1350 may couple the optical path into the waveguide layer 1215, 1315. For example, an optical signal exiting the optical fiber 10 propagating in a connector propagation direction 1282 may interact with the connector optical element 1275 and may be coupled to the optical path where the signal propagates in the optical path propagation direction 1284, may interact with the coupling element 1250 and may be coupled into the waveguide layer 1215 where the signal propagates in the waveguide propagation direction 1286.

In various embodiments, the optical fiber interfacing component 1270, 1370 and the waveguide interface component 1254, 1354 comprise materials that are substantially transparent to the optical signal. For example, the optical signal may not be substantially absorbed or dispersed by the material of the optical fiber interfacing component 1270, 1370 and/or the waveguide interface component 1254, 1354.

In various embodiments, the optical path (illustrated by the dotted lines in FIGS. 12 and 13) may comprise one or more optical elements configured to focus, magnify, and/or adjust the focus and/or magnification of an optical signal propagating along the optical path. For example, in the illustrated embodiments, the waveguide interfacing components 1254, 1354 comprise respective lenses 1252, 1352 configured to focus, magnify, and/or adjust the focus and/or magnification of an optical signal propagating along the optical path.

In various embodiments, the connector 1255, 1355 comprises one or more legs 1260 (e.g., 1260A, 1260B), 1360 (e.g., 1360A, 1360B) configured to structurally support the optical fiber interfacing component 1270, 1370 and/or to maintain a particular spatial relationship between the optical fiber interfacing component 1270, 1370 and the second surface 1208, 1308 of the first substrate 1205, 1305. In an example embodiment, the one or more legs 1260, 1360 are configured to secure the waveguide interfacing component 1254, 1354 and the optical fiber interfacing component 1270, 1370 with respect to one another.

In an embodiment, a surface of the waveguide interfacing component 1354 and the second surface 1308 of the first substrate 1305 comprise mating alignment features. For example, in the embodiment illustrated in FIG. 13, a surface of the waveguide interfacing component 1354 comprises alignment pins or protrusions 1359 (e.g., 1359A, 1359B, 1359C) and the second surface 1308 of the first substrate 1305 comprises corresponding alignment holes or notches 1309 (e.g., 1309A, 1309B, 1309C). When the connector 1355 is positioned with respect to the SiP chip 1340 such that the alignment pins and/or protrusion 1359 are mated with and/or engaged with respective alignment holes or notches 1309, the connector optical component 1375 is aligned with a respective coupling element 1350 via the optical path (e.g., possibly via optical component 1352).

In various embodiments, the cavity 1272 etched and/or formed into the optical fiber interfacing component 1270 is shaped such that alignment of the optical fiber 10 with a connector optical element 1275 configured to couple the optical fiber 10 and the connector optical path is achieved and/or effected using the shape of the cross-section of the at least one cavity as an alignment guide. In various embodiments, the one or more cavities 1272 are formed using laser drilling, wet etching, DRIE, and/or the like. In various embodiments, the connector comprises a plurality of cavities 1272 each configured to have an optical fiber 10 secured therein to couple the respective optical fiber with a corresponding portion of one or more PICs of the SiP chip 1240 via a respective corresponding coupling element 1250. In such embodiments, the optical fibers 10 may be mechanically secured into a fiber block. In an example embodiment, the fiber block comprises and/or terminates in an MT ferrule. In an example embodiment, the fiber block is configured to be used as part of a detachable fiber connection arrangement, similar to that shown in FIG. 10. For example, the fiber block may be used to prevent unprotected optical fibers from extending from the SiP chip.

CONCLUSION

Many modifications and other embodiments of the invention set forth herein will come to mind to one skilled in the art to which the invention pertains having the benefit of the teachings presented in the foregoing descriptions and the That which is claimed:

1. A silicon photonic (SiP) chip configured for backside or frontside optical fiber coupling, the SiP chip comprising:
  a photonic integrated circuit formed on a first surface of a first substrate, the photonic integrated circuit comprising at least one optical component and at least one corresponding coupling element, wherein the at least one optical component comprises at least one waveguide extending substantially parallel to the first surface;
  at least one cavity formed through a second surface of the first substrate, the at least one cavity aligned with the at least one corresponding coupling element, wherein the second surface of the first substrate is opposite the first surface of the first substrate, wherein the at least one cavity is a cavity array comprising a plurality of cavities, each cavity of the plurality of cavities aligned with a respective coupling element of the at least one corresponding coupling element; and
  at least one optical fiber secured within the at least one cavity such that the at least one optical fiber is optically coupled to the at least one optical component by the at least one corresponding coupling element, wherein the at least one optical fiber is a first plurality of optical fibers and each optical fiber of the first plurality of optical fibers is secured within a respective one of the plurality of cavities and optically coupled to a respective optical component of the at least one optical component by the respective coupling element, and wherein each optical fiber of the first plurality of optical fibers is mechanically secured to a first fiber block.

2. The SiP chip of claim 1, wherein each optical fiber of the first plurality of optical fibers has a length that is substantially equal to a depth of the respective one of the plurality of cavities plus a depth of the first fiber block.

3. The SiP chip of claim 1, wherein each optical fiber of the first plurality of optical fibers secured to the first fiber block is configured to be optically coupled to a respective one of a second plurality of optical fibers secured to a second fiber block, and the first fiber block is configured to be secured to the second fiber block in a mechanically detachable manner.

4. The SiP chip of claim 3, wherein at least one first optical fiber of the first plurality of optical fibers is optically coupled to a respective second optical fiber of the second plurality of optical fibers via at least one linking optical element.

5. The SiP chip of claim 1, wherein the at least one cavity extends in a transverse direction from the second surface of the first substrate toward the first surface of the first substrate and a cross-section of the at least one cavity in a plane that is substantially perpendicular to the transverse direction is elliptical or polygonal in shape, and wherein alignment of the at least one optical fiber with the at least one corresponding coupling element is achieved using the shape of the cross-section of the at least one cavity as an alignment guide.

6. The SiP chip of claim 1, wherein the at least one corresponding coupling element is a grating.

7. The SiP chip of claim 6, wherein at least one of:
  a portion of the first surface corresponding to the grating has a metallic or reflective coating thereon,
  the grating is a blazed or directional grating,
  an end of the at least one cavity through which light is provided to the grating has a prismatic shape, or
  an end of the at least one optical fiber is chamfered or angled.

8. The SiP chip of claim 1, wherein the at least one corresponding coupling element is a mirror.

9. The SiP chip of claim 1, wherein the SiP chip is flip-chip mounted on a second substrate such that the first surface of the first substrate is adjacent a surface of the second substrate.

10. A silicon photonic (SiP) chip comprising:
  a photonic integrated circuit formed on a first surface of a substrate, the photonic integrated circuit comprising at least one optical component and at least one corresponding coupling element;
  a cavity array formed through a second surface of the substrate opposite the first surface, wherein the cavity array comprises a plurality of cavities, and wherein each cavity of the plurality of cavities is aligned with a respective coupling element of the at least one corresponding coupling element;
  a plurality of optical fibers, wherein each optical fiber of the plurality of optical fibers is secured within a respective cavity of the plurality of cavities, and wherein each optical fiber of the plurality of optical fibers is optically coupled to a respective optical component of the at least one optical component by the respective coupling element; and
  a fiber block, wherein each optical fiber of the plurality of optical fibers is mechanically secured to the fiber block.

11. The SiP chip of claim 10, wherein each optical fiber of the plurality of optical fibers has a length that is substantially equal to a depth of the respective cavity of the plurality of cavities plus a depth of the fiber block.

12. The SiP chip of claim 10, wherein the plurality of optical fibers is a first plurality of optical fibers, wherein the fiber block is a first fiber block, wherein each optical fiber of the first plurality of optical fibers secured to the first fiber block is configured to be optically coupled to a respective one of a second plurality of optical fibers secured to a second fiber block, and wherein the first fiber block is configured to be secured to the second fiber block in a mechanically detachable manner.

13. The SiP chip of claim 12, wherein at least one first optical fiber of the first plurality of optical fibers is optically coupled to a respective second optical fiber of the second plurality of optical fibers via at least one linking optical element.

14. The SiP chip of claim 10, wherein the cavity array extends in a transverse direction from the second surface of the substrate toward the first surface of the substrate and a cross-section of each cavity of the plurality of cavities in a plane that is substantially perpendicular to the transverse direction is elliptical or polygonal in shape, and wherein alignment of each optical fiber of the plurality of optical fibers with the corresponding coupling element is achieved using the shape of the cross-section of the respective cavity as an alignment guide.

15. The SiP chip of claim 10, wherein the at least one corresponding coupling element is a grating.

16. The SiP chip of claim 15, wherein at least one of:
  a portion of the first surface corresponding to the grating has a metallic or reflective coating thereon, the grating is a blazed or directional grating, an end of at least one cavity through which light is provided to the grating has a prismatic shape, or an end of at least one optical fiber is chamfered or angled.

17. The SiP chip of claim 10, wherein the at least one corresponding coupling element is a mirror.

18. The SiP chip of claim 10, wherein the substrate is a first substrate, and wherein the SiP chip is flip-chip mounted on a second substrate such that the first surface of the first substrate is adjacent a surface of the second substrate.

19. A silicon photonic (SiP) chip comprising:
a photonic integrated circuit formed on a first surface of a substrate, the photonic integrated circuit comprising optical components and corresponding coupling elements;
cavities formed through a second surface of the substrate opposite the first surface, wherein each cavity is aligned with a respective coupling element of the corresponding coupling elements;
a fiber block; and
optical fibers mechanically secured to the fiber block, wherein each optical fiber is secured within a respective cavity of the cavities, and wherein each optical fiber is optically coupled to a respective optical component of the optical components by the respective coupling element.

20. The SiP chip of claim 19, wherein each optical fiber has a length that is substantially equal to a depth of the respective cavity plus a depth of the fiber block.

\* \* \* \* \*